(12) United States Patent
Riley et al.

(10) Patent No.: US 11,170,596 B2
(45) Date of Patent: Nov. 9, 2021

(54) REAL-TIME LOCATION OF AN OBJECT USING MULTIPLE ELECTRICAL DEVICES

(71) Applicant: SIGNIFY HOLDING B.V., Eindhoven (NL)

(72) Inventors: Peyton Riley, Suwanee, GA (US); Jonathan Whitten, Senoia, GA (US); Harold Allen, Senoia, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 25 days.

(21) Appl. No.: 16/408,948

(22) Filed: May 10, 2019

(65) Prior Publication Data
US 2020/0357207 A1    Nov. 12, 2020

(51) Int. Cl.
*G01S 3/02*    (2006.01)
*G05D 1/02*    (2020.01)
(Continued)

(52) U.S. Cl.
CPC .............. *G07C 9/28* (2020.01); *G01S 5/0249* (2020.05); *G01S 5/02213* (2020.05); *G01S 5/14* (2013.01);
(Continued)

(58) Field of Classification Search
CPC ........ G01S 13/767; G01S 13/878; G01S 1/08; G01S 5/02; G01S 5/021; G01S 5/0221; G01S 5/0226; G01S 5/0252; G01S 5/06; G01S 7/003; G01S 11/06; G01S 11/12; G01S 1/02; G01S 1/7034; G01S 1/7038; G01S 1/72; G01S 2201/02; G01S 5/0009; G01S 5/0054; G01S 5/02213; G01S 5/0263; G01S 5/0289; G01S 5/08; G01S 5/14; G01S 5/16; G06K 7/0008; G06K 7/10079; G06K 7/10356; G06K 19/0723; G06K 19/0702; G06K 19/0717; G06K 19/07758; G06K 19/07766; G06K 2009/00738; G06K 7/10297; G06K 7/10821; G06K 7/1413; G06K 9/00208; G06K 9/00624; G06K 9/00671; G06K 9/00711; G06K 9/00771; G06K 9/00791; G06K 9/00805;
(Continued)

(56) References Cited

U.S. PATENT DOCUMENTS

| 2012/0013509 A1* | 1/2012 | Wisherd ................... G01S 5/06 342/451 |
| 2016/0219676 A1 | 7/2016 | Mohan et al. |

(Continued)

*Primary Examiner* — Dionne Pendleton

(57) ABSTRACT

A system for locating an object in a volume of space can include a communication device of the object disposed in the volume of space, where the communication device broadcasts a first communication signal into the volume of space, where the first communication signal includes a first identification of the object. The system can also include multiple integrated sensor devices disposed in the volume of space, where each integrated sensor device includes at least one sensor, at least one receiver, and at least one transmitter, where the at least one receiver of a subset of the integrated sensor devices receives the first communication signal, where each of the subset determines a signal strength of the first communication signal. The system can further include at least one access controller that receives at least one second communication signal sent by the subset.

13 Claims, 13 Drawing Sheets

(51) Int. Cl.
  *G06Q 10/02*  (2012.01)
  *G07C 9/28*   (2020.01)
  *G01S 11/06*  (2006.01)
  *G01S 11/12*  (2006.01)
  *H04B 10/114* (2013.01)
  *H04W 64/00*  (2009.01)
  *G01S 5/14*   (2006.01)
  *G01S 13/87*  (2006.01)
  *G01S 5/02*   (2010.01)
  *G06K 7/10*   (2006.01)

(52) U.S. Cl.
  CPC .............. *G01S 11/06* (2013.01); *G01S 11/12* (2013.01); *G01S 13/878* (2013.01); *G06K 7/10118* (2013.01); *G06K 7/10297* (2013.01); *H04B 10/114* (2013.01); *H04W 64/006* (2013.01)

(58) Field of Classification Search
  CPC ...... G06K 9/18; G06K 9/3208; G06K 9/6256; G06K 9/78; G06Q 10/087; G06Q 30/0639; G06Q 10/02; G06Q 10/0631; G06Q 10/06311; G06Q 10/05315; G06Q 10/083; G06Q 10/0832; G06Q 10/0833; G06Q 10/1095; G06Q 10/30; G06Q 20/102; G06Q 20/12; G06Q 20/202; G06Q 30/016; G06Q 30/0281; G06Q 30/0601; G06Q 30/0605; G06Q 30/0613; G06Q 30/0617; G06Q 30/0619; G06Q 30/0631; G06Q 30/0633; G06Q 30/0635; G06Q 30/0641; G06Q 50/12; G06Q 50/28; G06Q 50/30; G06F 16/90335; G06F 21/606; G06F 3/017; G01K 3/005; G01K 3/10; G01N 33/004; G01N 33/0075; G01T 1/17; G05B 19/048; G05B 19/124; G05B 2219/23363; G05B 2219/39107; G05D 1/0011; G05D 1/0016; G05D 1/0022; G05D 1/0027; G05D 1/0061; G05D 1/0088; G05D 1/021; G05D 1/0214; G05D 1/0219; G05D 1/0234; G05D 1/0246; G05D 1/0255; G05D 1/0276; G05D 1/028; G05D 1/0289; G05D 1/0291; G05D 1/0293; G05D 1/0297; G05D 1/04; G05D 2201/0203; G05D 2201/0207; G05D 2201/0216; B60L 53/36; B60L 53/63; B60P 3/06; B60Q 9/00; B60Y 2200/14; B60Y 2200/30; B60Y 2200/50; B60Y 2410/10; B62B 5/0026; B62B 5/0069; B62B 5/0076; B64D 25/00; B64D 45/00; B64D 9/00; B64D 9/003; B65D 2203/10; B65D 2590/0083; B65D 25/02; B65D 90/06; B65D 90/22; B65D 90/48; B65F 2210/168; B65F 3/00; B65G 2201/0235; B65G 2203/0216; B66F 9/063; E01H 5/061; E01H 5/12; G01C 21/206; G01C 5/06; G01J 2005/0081; G01J 5/0014; G01J 5/0066; G01J 5/025; H04L 67/12; H04L 41/04; H04L 41/06; H04L 51/20; H04L 63/06; H04L 63/08; H04L 63/0846; H04L 67/04; H04L 67/141; H04L 67/143; H04L 67/18; H04L 67/20; H04L 69/28; A47F 10/04; A47F 13/00; A47F 2010/005; A47F 2010/025; A47F 3/08; A47L 11/4011; A47L 2201/04; A62C 31/22; A62C 37/04; A62C 37/40; A62C 37/44; A62C 3/002; A62C 3/07; A62C 3/08; A62C 3/10; A62C 3/16; B07C 2501/0045; B07C 2501/0054; B07C 2501/0063; B07C 5/28; B07C 5/3422; H04W 4/021; H04W 12/009; H04W 12/06; H04W 12/10; H04W 12/108; H04W 24/08; H04W 4/02; H04W 4/029; H04W 4/30; H04W 4/33; H04W 4/35; H04W 4/38; H04W 4/40; H04W 4/80; H04W 64/003; H04W 64/006; H04W 84/18; H04W 88/18; H04W 8/005
  See application file for complete search history.

(56) References Cited

U.S. PATENT DOCUMENTS

| 2016/0259341 | A1* | 9/2016 | High ..................... B60L 53/36 |
| 2018/0160269 | A1 | 6/2018 | Baarman et al. |
| 2018/0205459 | A1 | 7/2018 | Verma et al. |
| 2018/0365663 | A1* | 12/2018 | Bell ....................... G06Q 10/087 |
| 2020/0094091 | A1* | 3/2020 | Skaaksrud ............ H04W 4/38 |

\* cited by examiner

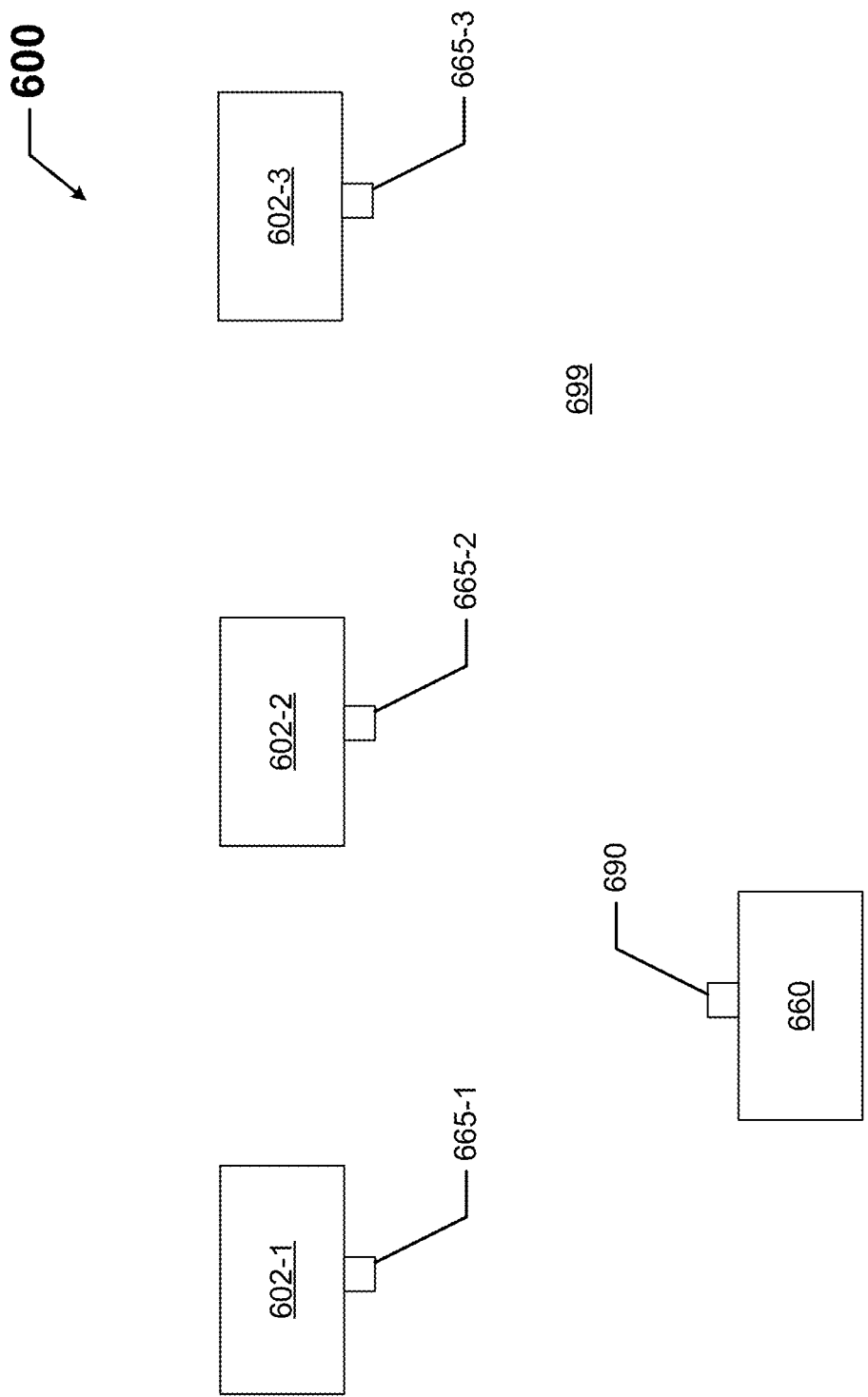

REAL-TIME LOCATION OF AN OBJECT USING MULTIPLE ELECTRICAL DEVICES

TECHNICAL FIELD

Embodiments described herein relate generally to locating objects in a space, and more particularly to systems, methods, and devices for locating objects in real time in a connected system.

BACKGROUND

Different methods are used to locate an object within a volume of space. For example, when signals (e.g. radio frequency (RF) signals) are involved, the strength of each signal can be measured to help determine the location of an object within a volume of space. When the location is done in real-time, the system to implement this process is often referred to as a real-time location system (RLTS).

SUMMARY

In general, in one aspect, the disclosure relates to a system for locating an object in a volume of space. The system can include a communication device of the object disposed in the volume of space, where the communication device broadcasts a first communication signal into the volume of space, where the first communication signal includes a first identification of the object. The system can also include multiple integrated sensor devices disposed in the volume of space, where each integrated sensor device includes at least one sensor, at least one receiver, and at least one transmitter, where the at least one receiver of a first subset of the integrated sensor devices receives the first communication signal broadcast by the communication device of the object, where each integrated sensor device that receives the first communication signal determines a signal strength of the first communication signal. The system can further include at least one access controller communicably coupled to the integrated sensor devices, where the at least one access controller receives at least one second communication signal sent by the at least one transmitter of each integrated sensor device of the first subset of integrated sensor devices, where the at least one second communication signal includes the first identification of the object and a second identification of each integrated sensor device of the first subset of integrated sensor devices, where the at least one second communication signal is associated with the signal strength of the first communication signal received by each integrated sensor device of the first subset of integrated sensor devices.

In another aspect, the disclosure can generally relate to an integrated sensor device. The integrated sensor device can include at least one receiver that is configured to receive a first communication signal broadcast by a communication device of an object, where the first communication signal includes a first identification of the object. The integrated sensor device can also include at least one sensor that measures at least one parameter, where the at least one parameter includes occupancy within a sensing range. The integrated sensor device can further include a controller that is configured to generate a second communication signal based on the first identification of the object and occupancy within the sensing range. The integrated sensor device can also include at least one transmitter that is configured to send the second communication to an access controller.

These and other aspects, objects, features, and embodiments will be apparent from the following description and the appended claims.

BRIEF DESCRIPTION OF THE DRAWINGS

The drawings illustrate only example embodiments of real-time location of an object using multiple electrical devices and are therefore not to be considered limiting of its scope, as real-time location of an object using multiple electrical devices may admit to other equally effective embodiments. The elements and features shown in the drawings are not necessarily to scale, emphasis instead being placed upon clearly illustrating the principles of the example embodiments. Additionally, certain dimensions or positioning may be exaggerated to help visually convey such principles. In the drawings, reference numerals designate like or corresponding, but not necessarily identical, elements.

FIGS. 6A and 6B show a side and top view, respectively, of a system in which an object is located in a volume of space in accordance with certain example embodiments.

DETAILED DESCRIPTION OF EXAMPLE EMBODIMENTS

Figure 1:
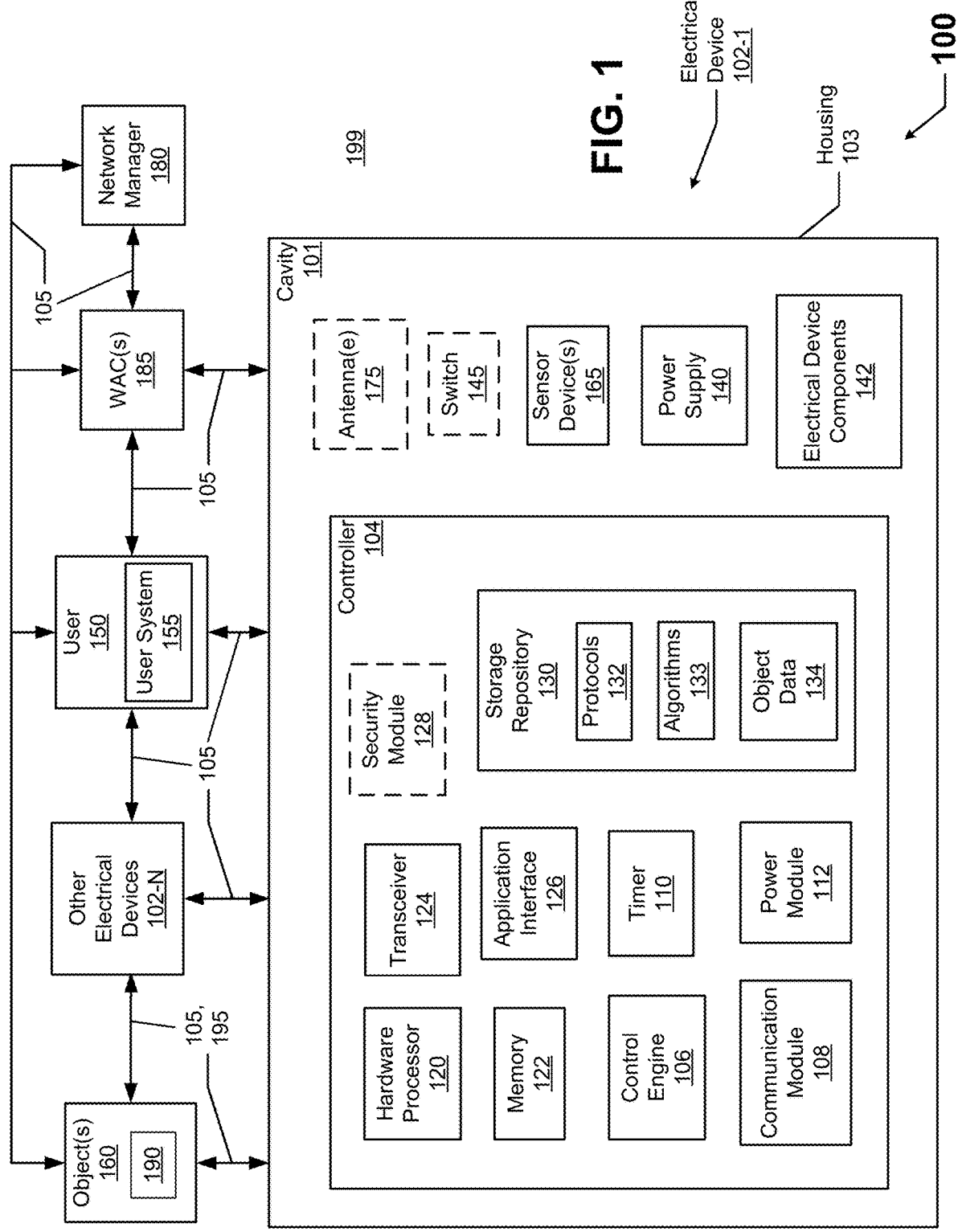
FIG. 1 shows a diagram of a system in accordance with certain example embodiments.

The example embodiments discussed herein are directed to systems, methods, and devices for real-time location of an object using multiple electrical devices. While example embodiments are described herein as using multiple light fixtures to locate an object in a volume of space, example embodiments can use one or more of a number of other electrical devices in addition to, or as an alternative to, light fixtures. Such other electrical devices can include, but are not limited to, a light switch, a control panel, a thermostat, an electrical wall outlet, a sensor device (e.g., a smoke detector, a $CO_2$ monitor, a motion detector, a broken glass sensor), an integrated sensor device (defined below), and a camera.

Further, any of a number of location methods can be used with example embodiments to locate one or more objects in real-time (using RLTS). Examples of such location methods can include, but are not limited to, time-of-flight (ToF), angle of arrival (AoA), and angle of departure (AoD). Any of these methods can involve measurements of one or more other parameters with respect to signals aside from signal strength. Examples of such other parameters can include, but are not limited to, distance of travel, angle, and time of travel.

Example embodiments can be used for a volume of space having any size and/or located in any environment (e.g., indoor, outdoor, hazardous, non-hazardous, high humidity, low temperature, corrosive, sterile, high vibration). Further, while signals described herein are radio frequency (RF) signals, example embodiments can be used with any of a number of other types of signals and/or platform, including but not limited to visible light signals, LiFi, WiFi, Bluetooth, Bluetooth Low Energy (BLE), RFID, ultraviolet waves, microwaves, and infrared signals. For example, RF signals transmitted using BLE are sent and received at approximately 2.4 GHz.

When an electrical device in an example system is a light fixture (also called a luminaire), the light fixture can be any of a number of types of light fixtures, including but not limited to a troffer, a pendant light fixture, a floodlight, a spotlight, an emergency egress fixture, an exit sign, a down can light fixture, and a high bay light fixture. Regardless of the type of light fixture, such a light fixture can use one or more of a number of different types of light sources, including but not limited to light-emitting diode (LED) light sources, fluorescent light sources, organic LED light sources, incandescent light sources, and halogen light sources. Therefore, light fixtures described herein, even in hazardous locations, should not be considered limited to a particular type of light source.

Example embodiments provide various methods to locate an object in a volume of space in an efficient manner that uses relatively little bandwidth. Example embodiments can be used to locate an object in real time in two dimensions or in three dimensions using RTLS structures. In addition, example embodiments, provide a high level of data security if such security is desired by a user. Example embodiments are also more reliable compared to location methods used in the current art, using low amounts of power on demand. Example embodiments can be installed with new electrical (e.g., lighting, security, entertainment, HVAC) systems. Alternatively, example embodiments can be programmed into existing electrical systems and related equipment with little to no need to add or modify existing hardware.

In certain example embodiments, electrical devices used for real-time location of an object are subject to meeting certain standards and/or requirements. For example, the National Electric Code (NEC), the National Electrical Manufacturers Association (NEMA), the International Electrotechnical Commission (IEC), the Federal Communication Commission (FCC), and the Institute of Electrical and Electronics Engineers (IEEE) set standards as to electrical enclosures (e.g., light fixtures), wiring, and electrical connections. Use of example embodiments described herein meet (and/or allow a corresponding device to meet) such standards when required. In some (e.g., PV solar) applications, additional standards particular to that application may be met by the electrical enclosures described herein.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three-digit number or a four-digit number, and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of real-time location of an object using multiple electrical devices will be described more fully hereinafter with reference to the accompanying drawings, in which example embodiments of real-time location of an object using multiple electrical devices are shown. Real-time location of an object using multiple electrical devices may, however, be embodied in many different forms and should not be construed as limited to the example embodiments set forth herein. Rather, these example embodiments are provided so that this disclosure will be thorough and complete, and will fully convey the scope of real-time location of an object using multiple electrical devices to those or ordinary skill in the art. Like, but not necessarily the same, elements (also sometimes called components) in the various figures are denoted by like reference numerals for consistency.

Terms such as "first", "second", and "within" are used merely to distinguish one component (or part of a component or state of a component) from another. Such terms are not meant to denote a preference or a particular orientation, and such terms are not meant to limit embodiments of real-time location of an object using multiple electrical devices. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a diagram of a system 100 that includes multiple electrical devices 102 and one or more objects 160 in a volume of space 199 in accordance with certain example embodiments. The system 100 can also include a user 150, a network manager 180, and one or more wireless access controllers 185 (WACs 185). Each electrical device 102 (e.g., electrical device 102-1) can include a controller 104, one or more sensor devices 165, one or more optional antennae 175, an optional switch 145, a power supply 140, and a number of electrical device components 142. The controller 104 can include one or more of a number of components. Such components, can include, but are not limited to, a control engine 106, a communication module 108, a timer 110, a power module 112, a storage repository 130, a hardware processor 120, a memory 122, a transceiver 124, an application interface 126, and, optionally, a security module 128.

The components shown in FIG. 1 are not exhaustive, and in some embodiments, one or more of the components shown in FIG. 1 may not be included in an example electrical device 102. Any component of the example electrical device 102 can be discrete or combined with one or more other components of the electrical device 102. For example, each electrical device 102 in the system 100 can have its own controller 104. Alternatively, one controller 104 can be used to control multiple electrical devices 102 in the system. An electrical device 102 is any device that uses electricity, at least in part, to operate. A list of some potential electrical devices 102 is described above.

A user 150 may be any person that interacts with an electrical device 102 and/or object 160 in the volume of space 199. Specifically, a user 150 may program, operate, and/or interface with one or more components (e.g., a controller, a network manager) associated with the system 100 using example embodiments. Examples of a user 150 can include, but are not limited to, an employee, an engineer, an electrician, a technician, an operator, a consultant, a contractor, an asset, a network manager, and a manufacturer's representative.

The user 150 can use a user system 155, which may include a display (e.g., a GUI). The user 150 (including a user system 155) interacts with (e.g., sends data to, receives data from) the controller 104 of an electrical device 102 via the application interface 126 (described below). The user 150 (including a user system 155)can also interact with a network manager 180, the sensor devices 165, and/or one or more of the objects 160. Interaction (including transmission of RF signals 195) between the user 150 (including a user system 155) and the electrical device 102, the network manager 180, the sensor devices 165, and the objects 160 can be facilitated using communication links 105.

Each communication link 105 can include wired (e.g., Class 1 electrical cables, Class 2 electrical cables, electrical connectors) and/or wireless (e.g., Wi-Fi, visible light communication, cellular networking, Bluetooth, Bluetooth Low Energy (BLE), Zigbee, WirelessHART, ISA100, Power Line Carrier, RS485, DALI) technology. For example, a communication link 105 can be (or include) one or more electrical conductors that are coupled to the housing 103 of an electrical device 102 and to the network manager 180. The communication links 105 can transmit signals (e.g., power signals, communication signals, RF signals 195, control signals, data) between the electrical devices 102, the user 150 (including a user system 155), the sensor devices 165, the objects 160, and/or the network manager 180. For example, the electrical devices 102 of the system 100 can interact with the one or more objects 160 by transmitting RF signals 195 over one or more communication links 105, as discussed below. The signals transmitted over the communication links 105 are made up of bits of data.

The network manager 180 is a device or component that controls all or a portion of the system 100 that includes the controller 104 of at least one of the electrical devices 102 and the WACs 185. The network manager 180 can be substantially similar to the controller 104 and/or a WAC 185. Alternatively, the network manager 180 can include one or more of a number of features in addition to, or altered from, the features of the controller 104 and/or a WAC 185, both described below. There can be more than one network manager 180 and/or one or more portions of a network manager 180.

In some cases, a network manager 180 can be called an insight manager or a RTLS engine. In such a case, the network manager 180 receives data from the WACs 185 and processes this data (e.g., using algorithms 133 and/or protocols 132) to determine the location of one or more objects 160 in real time. The network manager 180 can be located in the volume of space 199 or remotely from the volume of space 199. The network manager 180 can use the various communications received from the WACs 185 to locate an object 160 in two dimensions or in three dimensions within the volume of space 199.

Each WAC 185 (sometimes more simply called an access controller, as a generic term and/or when wired communication links 105 are involved) performs a number of different functions. For example, a WAC 185 can help communicate with and control the controller 104 of one or more electrical devices 102 to help control the operation of those electrical devices 102. For RTLS applications, the WAC 185 can be responsible for pairing with the Zigbee-enabled sensor devices 165, providing configuration data to the sensor devices 165, synchronizing the timing of those sensor devices 165, supporting the firmware of those sensor devices 165, upgrading those sensor devices 165, receiving location/telemetry data (e.g., using a Zigbee-enabled communication links 105) from the sensor devices 165, and/or performing any other function with respect to those sensor devices 165 to support RTLS activities.

When a WAC 185 receives data (e.g., packed egress data that arrives as ingress data) from a sensor device 165, the WAC 185 can convert the data into a different format (e.g., ECAPI). The WAC 185 can then send the newly-formatted data to the network manager 180. To help diagnose issues, a WAC 185 can maintain counters for each paired sensor device 165 and include, for example, the number of received packed data messages from a particular sensor device 165, the number of formatted messages successfully transmitted to the network manager 180 that pertain to the packed data from a particular sensor device 165, and the number of formatted messages pertaining to the packed data from a particular sensor device 165 that failed to transmit to the network manager 180.

In some cases, a WAC 185 maintains the average and maximum latency introduced between the receipt of a message from a sensor device 165 and transmission of a formatted message to the network manager 180. The WAC 185 can also notify the network manager 180 when the average or maximum latency exceeds a threshold value. Further, a WAC 185 can communicate to the network manager 180 when there is a significant discrepancy (e.g., as determined by the WAC 185) between the ingress and egress packets with respect to a sensor device 165. When there are multiple WACs 185, they can all be time-synchronized with each other. In some cases, the functionality of a WAC 185 can be the same as, or at least partially combined with, the functionality of the controller 104 of an electrical device 102. A WAC 185 can be located in the volume of space 199 or remotely from the volume of space 199.

As defined herein, an object 160 can be any unit or group of units. An object 160 can move on its own, is capable of being moved, or is stationary. Examples of an object 160 can include, but are not limited to, a person (e.g., a user 150, such as a visitor or an employee), a part (e.g., a motor stator, a cover), a piece of equipment (e.g., a fan, a container, a table, a chair), or a group of parts of equipment (e.g., a pallet stacked with inventory). A system 100 can have one object 160 or multiple objects 160 in the volume of space 199.

Each object 160 can include a communication device 190 (also sometimes called a tag, a beacon, or other name known in the art, depending on the configuration of the communication device 190), which can receive RF signals 195 from and/or send RF signals 195 to one or more electrical devices 102. The communication device 190 of an object 160 can broadcast RF signals 195 that can be received by any electrical devices 102 within range of the broadcast or send RF signals 195 addressed to electrical devices 102.

A communication device 190 can include one or more of a number of components (e.g., transceiver, antenna, switch, power module) and/or have the functionality described below with respect to a controller 104 and/or an associated electrical device 102. For example, a communication device 190 can include a control engine, a transceiver, and an antenna to allow the communication device 190 to send RF signals 195 to and/or receive RF signals 195 from one or more electrical devices 102 in the system 100.

Using example embodiments, a communication device 190 of an object 160 can be in sleep mode for a predefined interval, at which point it stays awake for a period of time or until the communication device 190 receives a RF signal 195 broadcast by one or more electrical devices 102. When this occurs, the communication device 190 can turn on long enough to interpret the initial RF signal 195, and then generate and send its own RF signal 195 to one or more of the electrical devices 102 in response to the initial RF signal 195. This response RF signal 195 can include a UUID as well as a reference (e.g., signal code) to the initial RF signal 195 and/or the electrical device 102 that sent the initial RF signal 195, if any. Once the response RF signal 195 is sent by a communication device 190, the communication device 190 can go back into sleep mode, thereby reserving a considerable amount of power.

The communication device 190 can use one or more of a number of communication protocols in sending RF signals 195 to and/or receiving RF signals 195 from the electrical devices 102. In certain example embodiments, an object 160 (or a portion thereof, such as the communication device 190) can include a battery (a form of power supply or power module) that is used to provide power, at least in part, to some or all of the rest of the object 160, including the communication device 190.

A user 150 (including a user system 155), the network manager 180, one or more sensor devices 165, one or more WACs 185, and/or the other electrical devices 102-N can interact with the controller 104 of the electrical device 102-1 using the application interface 126 in accordance with one or more example embodiments. Specifically, the application interface 126 of the controller 104 receives data (e.g., information, communications, instructions) from and sends data (e.g., information, communications, instructions) to the user 150 (including a user system 155), the network manager 180, the sensor devices 165, one or more WACs 185, and/or one or more of the other electrical devices 102-N. The user 150 (including a user system 155), the network manager 180, the sensor devices 165, one or more WACs 185, and/or one or more of the other electrical devices 102-N can include an interface to receive data from and send data to the controller 104 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The controller 104, the user 150 (including a user system 155), the network manager 180, the sensor devices 165, one or more WACs 185, and/or one or more of the other electrical devices 102-N can use their own system or share a system in certain example embodiments. Such a system can be, or contain a form of, an Internet-based or an intranet-based computer system that is capable of communicating with various software. A computer system includes any type of computing device and/or communication device, including but not limited to the controller 104. Examples of such a system can include, but are not limited to, a desktop computer with a Local Area Network (LAN), a Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 2.

Further, as discussed above, such a system can have corresponding software (e.g., user software, controller software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the system 100.

The electrical device 102-1 can include a housing 103. The housing 103 can include at least one wall that forms a cavity 101. In some cases, the housing 103 can be designed to comply with any applicable standards so that the electrical device 102-1 can be located in a particular environment (e.g., a hazardous environment). The housing 103 of the electrical device 102-1 can be used to house one or more components of the electrical device 102-1, including one or more components of the controller 104. For example, as shown in FIG. 1, the controller 104 (which in this case includes the control engine 106, the communication module 108, the timer 110, the power module 112, the storage repository 130, the hardware processor 120, the memory 122, the transceiver 124, the application interface 126, and the optional security module 128), the one or more sensor devices 165, an optional switch 145, one or more optional antennae 175, the power supply 140, and the electrical device components 142 are disposed in the cavity 101 formed by the housing 103. In alternative embodiments, any one or more of these or other components of the electrical device 102-1 can be disposed on the housing 103 and/or remotely from the housing 103.

The storage repository 130 can be a persistent storage device (or set of devices) that stores software and data used to assist the controller 104 in communicating with the user 150 (including a user system 155), the network manager 180, one or more of the objects 160, the sensor devices 165, one or more WACs 185, and one or more of the other electrical devices 102-N within the system 100. In one or more example embodiments, the storage repository 130 stores one or more protocols 132, one or more algorithms, 133, and object data 134.

The protocols 132 can be any procedures (e.g., a series of method steps) and/or other similar operational procedures that the control engine 106 of the controller 104 follows based on certain conditions at a point in time. The protocols 132 can also include any of a number of communication protocols that are used to send and/or receive data between the controller 104 and the user 150 (including a user system 155), the network manager 180, the one or more of the other electrical devices 102-N, the sensor devices 165, one or more WACs 185, and one or more of the objects 160. One or more of the protocols 132 used for communication can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the protocols 132 used for communication can provide a layer of security to the data transferred within the system 100.

The algorithms 133 can be any formulas, mathematical models, forecasts, simulations, and/or other similar tools that the control engine 106 of the controller 104 uses to reach a computational conclusion. An example of one or more algorithms 133 is calculating the strength of a RF signal 195 and comparing the strength of a RF signal 195 with a threshold value. Algorithms 133 can be used to analyze past data, analyze current data, and/or perform forecasts.

One or more particular algorithms 133 can be used in conjunction with one or more particular protocols 132. For example, one or more protocols 132 and one or more algorithms 133 can be used in conjunction with each other to track an object 160 using occupancy information measured by one or more sensor devices 165. As another example, one or more protocols 132 and one or more algorithms 133 can be used in conjunction with each other to track an object 160 using encoded IR signaling, which can involve one or more sensor devices 165. As still another example, one or more protocols 132 and one or more algorithms 133 can be used in conjunction with each other to track an object 160 based on a temporal separation of objects 160 based on a received signal strength indicator (RSSI), which can be measured by one or more sensor devices 165.

Object data 134 can be any data associated with each object 160 (including an associated communication device 190) that is communicably coupled to the controller 104. Such data can include, but is not limited to, a manufacturer of the object 160, a model number of the object 160, communication capability of the communication device 190 of an object 160, last known location of the object 160, and age of the object 160. Examples of a storage repository 130 can include, but are not limited to, a database (or a number of databases), a file system, a hard drive, flash memory, some other form of solid state data storage, or any suitable combination thereof. The storage repository 130 can be located on multiple physical machines, each storing all or a portion of the protocols 132, the algorithms 133, and/or the object data 134 according to some example embodiments. Each storage unit or device can be physically located in the same or in a different geographic location.

The storage repository 130 can be operatively connected to the control engine 106. In one or more example embodiments, the control engine 106 includes functionality to communicate with the user 150 (including a user system 155), the network manager 180, the objects 160, the sensor devices 165, one or more WACs 185, and the other electrical devices 102-N in the system 100. More specifically, the control engine 106 sends information to and/or receives information from the storage repository 130 in order to communicate with the user 150 (including a user system 155), the network manager 180, the objects 160, the sensor devices 165, one or more WACs 185, and the other electrical devices 102-N. As discussed below, the storage repository 130 can also be operatively connected to the communication module 108 in certain example embodiments.

In certain example embodiments, the control engine 106 of the controller 104 controls the operation of one or more components (e.g., the communication module 108, the timer 110, the transceiver 124) of the controller 104. For example, the control engine 106 can put the communication module 108 in "sleep" mode when there are no communications between the controller 104 and another component (e.g., an object 160, a sensor device 165, a WAC 185, a user system 155) in the system 100 or when communications between the controller 104 and another component in the system 100 follow a regular pattern. In such a case, power consumed by the controller 104 is conserved by only enabling the communication module 108 when the communication module 108 is needed.

As another example, the control engine 106 can direct the timer 110 when to provide a current time, to begin tracking a time period, and/or perform another function within the capability of the timer 110. As yet another example, the control engine 106 can direct the transceiver 124 to send RF signals 195 (or other types of communication) and/or stop sending RF signals 195 (or other types of communication) to one or more sensor devices 165 and/or one or more WACs 185 in the system 100. The control engine 106 can also instruct a sensor device 165 to communicate with an object 160 (or a communication device 190 thereof), with a WAC 185, and/or with the controller 104. This example provides another instance where the control engine 106 can conserve power used by the controller 104 and other components (e.g., the objects 160, the sensor devices 165) of the system 100.

The control engine 106 can determine when to broadcast one or more RF signals 195 in an attempt to locate an object 160. To conserve energy, the control engine 106 does not constantly broadcast RF signals 195, but rather only does so at discrete times. The control engine 106 can broadcast a RF signal 195 based on one or more of a number of factors, including but not limited to passage of time, the occurrence of an event, instructions from a user 150 (including a user system 155), and a command received from the network manager 180. The control engine 106 can coordinate with the controllers 104 of one or more of the other electrical devices 102-N and/or directly control one or more of the other electrical devices 102-N to broadcast multiple RF signals 195. The control engine 106 can also determine the signal strength (e.g., RSSI) of one or more of the RF signals 195 that are broadcast by the object 160, in some cases in response to the RF signal 195 broadcast by the electrical device 102-1.

In some cases, the control engine 106 of the electrical device 102-1 (or, in some cases, the network manager 180 communicating with the controller 104) can locate the object 160 based on the multiple RF signals 195 sent by the object 160, in some cases in response to the multiple RF signals 195 broadcast by the electrical devices 102. To accomplish this, the control engine 106 obtains the multiple RF signals 195 (directly and/or from another control engine 106 from one or more of the other electrical devices 102-N) broadcast by the object 160 and uses one or more protocols 132 and/or algorithms 133 to determine the location of the object 160.

Figure 6B:
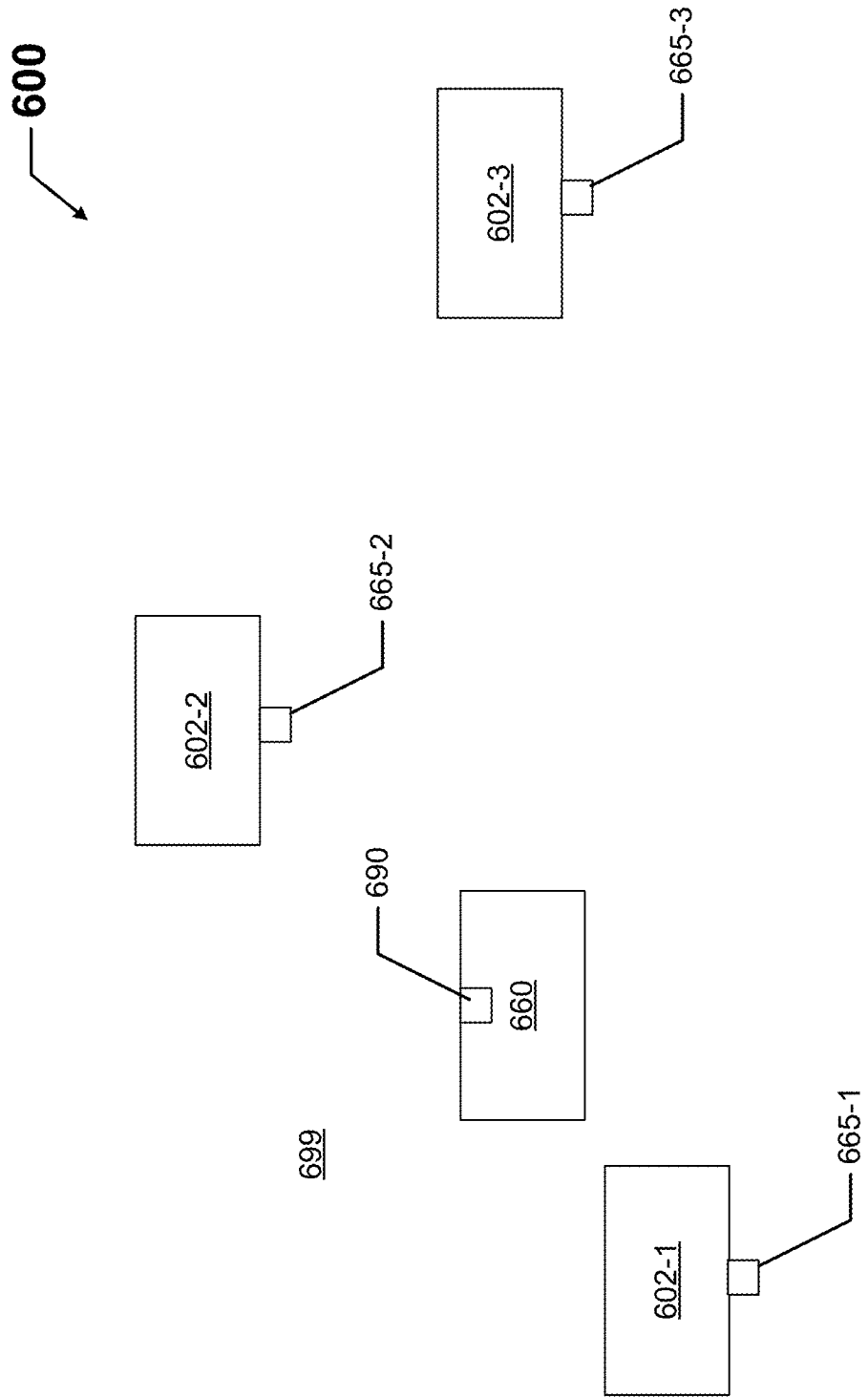
Figure 7:
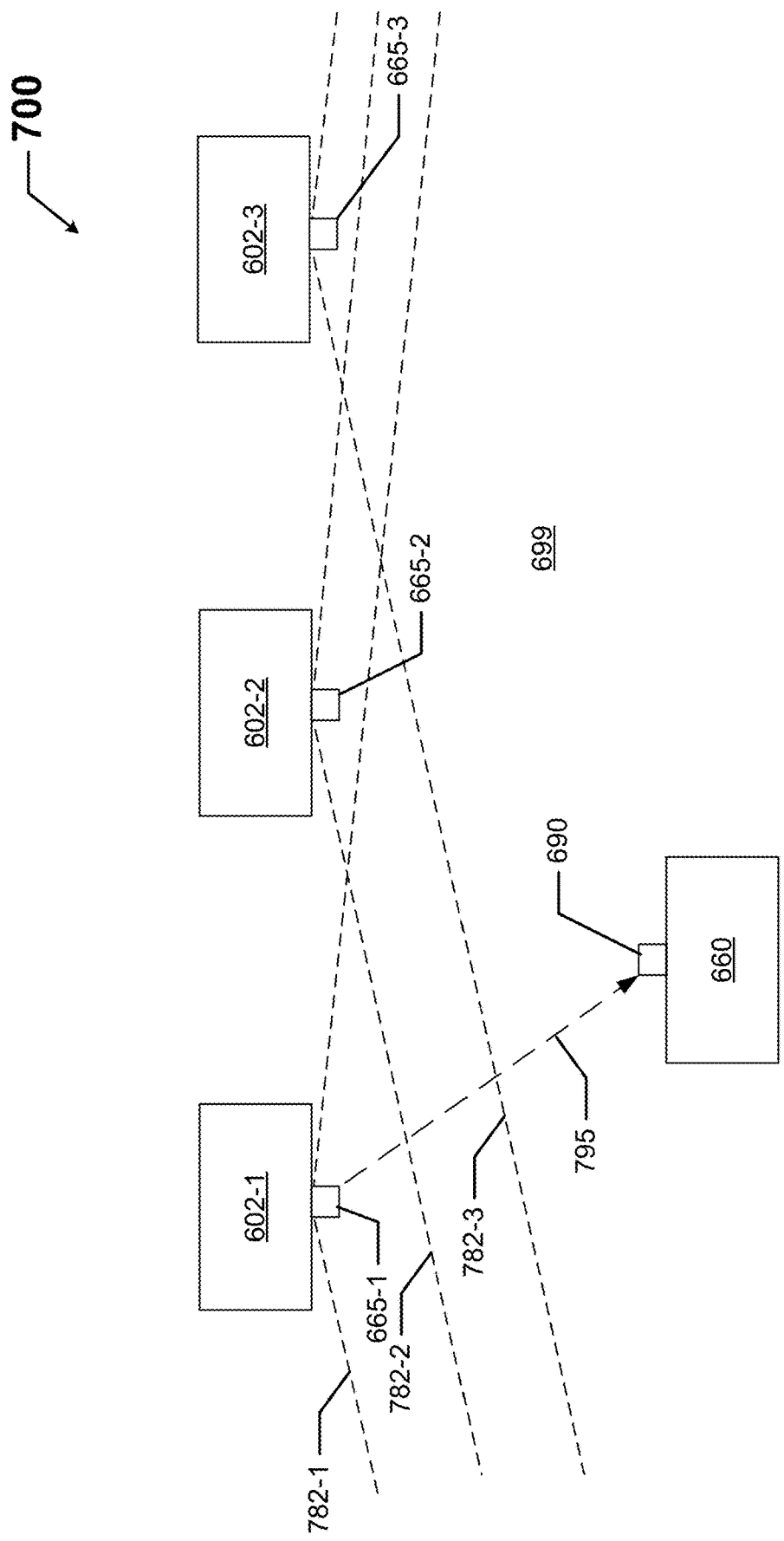
FIG. 7 shows the system of FIGS. 6A and 6B when a signal is sent by one of the light fixtures in accordance with certain example embodiments.
Figure 8:
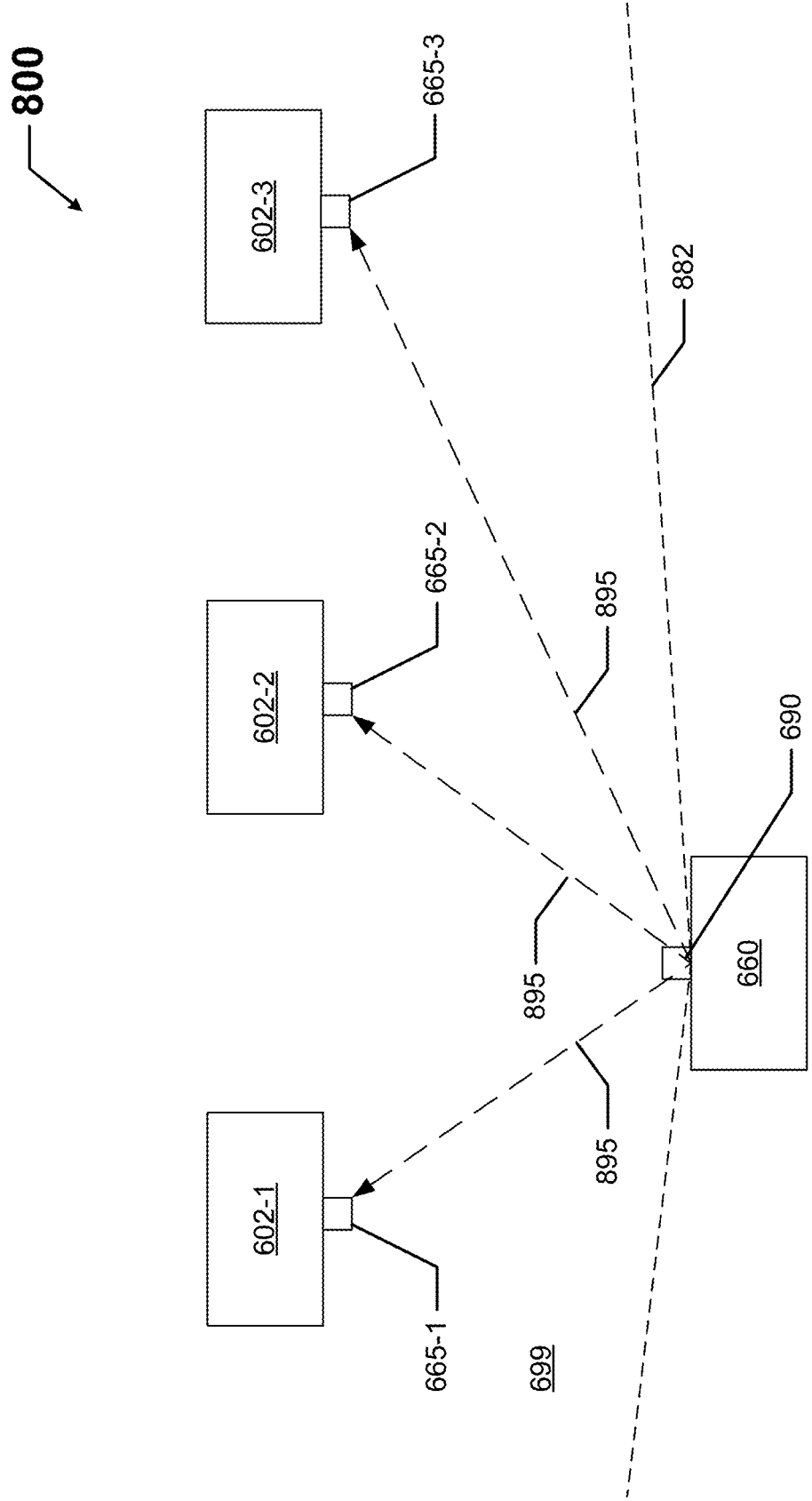
FIG. 8 shows the system of FIGS. 6A through 7 when a signal is sent by the object in accordance with certain example embodiments.

For example, the protocols 132 and/or algorithms 133 used by the control engine 106 can track an object 160 using occupancy information, a detailed example of which is shown in FIGS. 6A and 6B below. As another example, the protocols 132 and/or algorithms 133 used by the control engine 106 can track an object 160 using encoded IR signaling, a detailed example of which is shown in FIG. 7 below. As yet another example, the protocols 132 and/or algorithms 133 used by the control engine 106 can track an object 160 using a temporal separation of objects 160 based on RSSI, a detailed example of which is shown in FIG. 8 below. These examples embodiments use information provided by one or more sensor devices 165 and have the advantages of using less bandwidth of data and improving accuracy relative to currently-used technology and/or methods. Example embodiments can locate one or more objects 160 in a volume of space 199 in two or three dimensions.

The control engine 106 of the controller 104 can also use the protocols 132 and/or the algorithms 133 to extract the ID of an object 165 from a communication signal (e.g., RF signal 195) received from the communication device 190 of the object 160 directly by the transceiver 124 or by an integrated sensor device 165. The control engine 106 of the controller 104 can also use the storage repository 130, the protocols 132, and/or the algorithms 133 to determine if the ID of the object 165 is part of a list of IDs. Such a list can be used to determine whether subsequent communication generated by the control engine 106 is sent to a WAC 185.

The control engine 106 of the controller 104 can further use the protocols 132 and/or the algorithms 133 to interpret the measurements made by one or more of the sensors of the integrated sensor module 165. For instance, if the integrated sensor device 165 includes a PIR sensor, then the PIR sensor can detect motion within a sensing range and/or occupancy within a RTLS occupancy zone, both of which are discussed below with respect to FIGS. 9A and 9B. In such a case, the control engine 106 can interpret these detections by the PIR sensor.

The control engine 106 of the controller 104 can also use the protocols 132 and/or the algorithms 133 to generate a subsequent communication signal to a WAC 185 that is based on receipt of the first communication signal. For example, a subsequent communication signal can include a number of bits that are directed to information such as, for example, the ID of the object 160, the ID of the sensor device 165, and the RSSI of the communication signal (e.g., RF signal 195) received by the sensor device 165.

In some cases, control engine 106 of the controller 104 can further use the protocols 132 and/or the algorithms 133 to determine certain conditions that may call for a delay in generating and/or sending a second communication signal to a WAC 185 after receiving a first communication signal from the communication device 190 of an object 160. For example, if the RSSI value of the first communication signal from the communication device 190 of an object 160 is below a minimum threshold value, then the control engine 106 can determine that there should be a delay in generating and/or sending a subsequent second communication signal that is based on the first communication signal. This delay can be inversely proportional to the RSSI value of the first communication signal.

The control engine 106 can provide control, communication, and/or other similar signals to the user 150 (including a user system 155), the network manager 180, the other electrical devices 102-N, the sensor devices 165, one or more WACs 185, and one or more of the objects 160. Similarly, the control engine 106 can receive control, communication, and/or other similar signals from the user 150 (including a user system 155), the network manager 180, the other electrical devices 102-N, the sensor devices 165, one or more WACs 185, and one or more of the objects 160. The control engine 106 can communicate with each object 160 automatically (for example, based on one or more algorithms 133 stored in the storage repository 130) and/or based on control, communication, and/or other similar signals received from another device (e.g., the network manager 180, another electrical device 102) using the RF signals 195. The control engine 106 may include a printed circuit board, upon which the hardware processor 120 and/or one or more discrete components of the controller 104 are positioned.

In certain example embodiments, the control engine 106 can include an interface that enables the control engine 106 to communicate with one or more components (e.g., power supply 140) of the electrical device 102-1. For example, if the power supply 140 of the electrical device 102-1 operates under IEC Standard 62386, then the power supply 140 can include a digital addressable lighting interface (DALI). In such a case, the control engine 106 can also include a DALI to enable communication with the power supply 140 within the electrical device 102-1. Such an interface can operate in conjunction with, or independently of, the communication protocols 132 used to communicate between the controller 104 and the user 150 (including a user system 155), the network manager 180, the other electrical devices 102-N, the sensor devices 165, one or more WACs 185, and the objects 160.

The control engine 106 (or other components of the controller 104) can also include one or more hardware and/or software architecture components to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit ($I^2C$), and a pulse width modulator (PWM).

By using example embodiments, while at least a portion (e.g., the control engine 106, the timer 110) of the controller 104 is always on, the remainder of the controller 104 and the objects 160 can be in sleep mode when they are not being used. In addition, the controller 104 can control certain aspects (e.g., sending RF signals 195 to and receiving RF signals 195 from an object 160) of one or more other electrical devices 102-N in the system 100.

The communication network (using the communication links 105) of the system 100 can have any type of network architecture. For example, the communication network of the system 100 can be a mesh network. As another example, the communication network of the system 100 can be a star network. When the controller 104 includes an energy storage device (e.g., a battery as part of the power module 112), even more power can be conserved in the operation of the system 100. In addition, using time-synchronized communication protocols 132, the data transferred between the controller 104 and the user 150 (including a user system 155), the network manager 180, the sensor devices 165, one or more WACs 185, and the other electrical devices 102-N can be secure.

The communication module 108 of the controller 104 determines and implements the communication protocol (e.g., from the protocols 132 of the storage repository 130) that is used when the control engine 106 communicates with (e.g., sends signals to, receives signals from) the user 150 (including a user system 155), the network manager 180, the other electrical devices 102-N, the sensor devices 165, one or more WACs 185, and/or one or more of the objects 160. In some cases, the communication module 108 accesses the object data 134 to determine which communication protocol is within the capability of the object 160 for a RF signal 195 sent by the control engine 106. In addition, the communication module 108 can interpret the communication protocol of a communication (e.g., a RF signal 195) received by the controller 104 so that the control engine 106 can interpret the communication.

The communication module 108 can send data (e.g., protocols 132, object data 134) directly to and/or retrieve data directly from the storage repository 130. Alternatively, the control engine 106 can facilitate the transfer of data between the communication module 108 and the storage repository 130. The communication module 108 can also provide encryption to data that is sent by the controller 104 and decryption to data that is received by the controller 104. The communication module 108 can also provide one or more of a number of other services with respect to data sent from and received by the controller 104. Such services can include, but are not limited to, data packet routing information and procedures to follow in the event of data interruption.

The timer 110 of the controller 104 can track clock time, intervals of time, an amount of time, and/or any other measure of time. The timer 110 can also count the number of occurrences of an event, whether with or without respect to time. Alternatively, the control engine 106 can perform the counting function. The timer 110 is able to track multiple time measurements concurrently. The timer 110 can measure the time of flight (ToF) of one or more RF signals 195, even simultaneously. The timer 110 can track time periods based on an instruction received from the control engine 106, based on an instruction received from the user 150 (including a user system 155), based on an instruction programmed in the software for the controller 104, based on some other condition or from some other component, or from any combination thereof.

The power module 112 of the controller 104 provides power to one or more other components (e.g., timer 110, control engine 106) of the controller 104. In addition, in certain example embodiments, the power module 112 can provide power to the power supply 140 of the electrical device 102. The power module 112 can include one or more of a number of single or multiple discrete components (e.g., transistor, diode, resistor), and/or a microprocessor. The power module 112 may include a printed circuit board, upon which the microprocessor and/or one or more discrete components are positioned.

The power module 112 can include one or more components (e.g., a transformer, a diode bridge, an inverter, a converter) that receives power (for example, through an electrical cable) from a source external to the electrical device 102 and generates power of a type (e.g., alternating current, direct current) and level (e.g., 12V, 24V, 120V) that can be used by the other components of the controller 104 and/or by the power supply 140. In addition, or in the alternative, the power module 112 can be a source of power in itself to provide signals to the other components of the controller 104 and/or the power supply 140. For example, the power module 112 can include an energy storage device (e.g., a battery). As another example, the power module 112 can include a localized photovoltaic power system.

The hardware processor 120 of the controller 104 executes software in accordance with one or more example embodiments. Specifically, the hardware processor 120 can execute software on the control engine 106 or any other portion of the controller 104, as well as software used by the user 150 (including a user system 155), the network manager 180, the sensor devices 165, one or more WACs 185, and/or one or more of the other electrical devices 102-N. The hardware processor 120 can be an integrated circuit, a central processing unit, a multi-core processing chip, a multi-chip module including multiple multi-core processing chips, or other hardware processor in one or more example embodiments. The hardware processor 120 is known by other names, including but not limited to a computer processor, a microprocessor, and a multi-core processor.

In one or more example embodiments, the hardware processor 120 executes software instructions stored in memory 122. The memory 122 includes one or more cache memories, main memory, and/or any other suitable type of memory. The memory 122 is discretely located within the controller 104 relative to the hardware processor 120 according to some example embodiments. In certain configurations, the memory 122 can be integrated with the hardware processor 120.

In certain example embodiments, the controller 104 does not include a hardware processor 120. In such a case, the controller 104 can include, as an example, one or more field programmable gate arrays (FPGA), one or more insulated-gate bipolar transistors (IGBTs), and/or one or more integrated circuits (ICs). Using FPGAs, IGBTs, ICs, and/or other similar devices known in the art allows the controller 104 (or portions thereof) to be programmable and function according to certain logic rules and thresholds without the use of a hardware processor. Alternatively, FPGAs, IGBTs, ICs, and/or similar devices can be used in conjunction with one or more hardware processors 120.

The transceiver 124 of the controller 104 can send (using a transmitter) and/or receive (using a receiver) control and/or communication signals, including RF signals 195. Specifically, the transceiver 124 can be used to transfer data between the controller 104 and the user 150 (including a user system 155), the network manager 180, the other electrical devices 102-N, one or more of the sensor devices 165, one or more WACs 185, and/or the objects 160. The transceiver 124 can use wired and/or wireless technology. The transceiver 124 can be configured in such a way that the control and/or communication signals sent and/or received by the transceiver 124 can be received and/or sent by another transceiver that is part of the user 150 (including a user system 155), the network manager 180, the other electrical devices 102-N, one or more sensor devices 165, one or more WACs 185, and/or the objects 160.

When the transceiver 124 uses wireless technology, any type of wireless technology can be used by the transceiver 124 in sending and receiving signals (e.g., RF signals 195). Such wireless technology can include, but is not limited to, Wi-Fi, visible light communication, infrared (IR), cellular networking, Zigbee, BLE, and Bluetooth. For example, the transceiver 124 can include a Zigbee transmitter, a Zigbee receiver, a BLE receiver, a BLE transmitter, an active IR transmitter, and/or an active IR receiver. The transceiver 124 can use one or more of any number of suitable communication protocols (e.g., ISA100, HART) when sending and/or receiving signals, including RF signals 195. Such communication protocols can be stored in the protocols 132 of the storage repository 130. Further, any transceiver information for the user 150 (including a user system 155), the network manager 180, the other electrical devices 102-N, the sensor devices 165, one or more WACs 185, and/or the objects 160 can be part of the object data 134 (or similar areas) of the storage repository 130.

Optionally, in one or more example embodiments, the security module 128 secures interactions between the controller 104, the user 150 (including a user system 155), the network manager 180, the other electrical devices 102-N, the sensor devices 165, one or more WACs 185, and/or the objects 160. More specifically, the security module 128 authenticates communication from software based on security keys verifying the identity of the source of the communication. For example, user software may be associated with a security key enabling the software of a user system 155 of a user 150 to interact with the controller 104 of the electrical device 102-1. Further, the security module 128 can restrict receipt of information, requests for information, and/or access to information in some example embodiments.

As mentioned above, aside from the controller 104 and its components, the electrical device 102-1 can include a power supply 140, one or more sensor devices 165, one or more optional antennae 175, an optional switch 145, and one or more electrical device components 142. The electrical device components 142 of the electrical device 102-1 are devices and/or components typically found in the electrical device 102-1 to allow the electrical device 102-1 to operate. An electrical device component 142 can be electrical, electronic, mechanical, or any combination thereof. The electrical device 102-1 can have one or more of any number and/or type of electrical device components 142. For example, when the electrical device 102-1 is a light fixture, examples of such electrical device components 142 can include, but are not limited to, a light source, a light engine, a heat sink, an electrical conductor or electrical cable, a terminal block, a lens, a diffuser, a reflector, an air moving device, a baffle, a dimmer, and a circuit board.

The power supply 140 of the electrical device 102-1 provides power to one or more of the electrical device components 142. The power supply 140 can be substantially the same as, or different than, the power module 112 of the controller 104. The power supply 140 can include one or more of a number of single or multiple discrete components (e.g., transistor, diode, resistor), and/or a microprocessor. The power supply 140 may include a printed circuit board, upon which the microprocessor and/or one or more discrete components are positioned.

The power supply 140 can include one or more components (e.g., a transformer, a diode bridge, an inverter, a converter) that receives power (for example, through an electrical cable) from or sends power to the power module 112 of the controller 104. The power supply can generate power of a type (e.g., alternating current, direct current) and level (e.g., 12V, 24V, 120V) that can be used by the recipients (e.g., the electrical device components 142, the controller 106) of such power. In addition, or in the alternative, the power supply 140 can receive power from a source external to the electrical device 102-1. In addition, or in the alternative, the power supply 140 can be or include a source of power in itself. For example, the power supply 140 can include an energy storage device (e.g., a battery), a localized photovoltaic power system, or some other source of independent power.

Each of the one or more sensor devices 165 of the electrical device 102-1 can include any type of sensing device that measures one or more parameters. Examples of types of sensor devices 165 can include, but are not limited to, a passive infrared sensor, a photocell, a pressure sensor, an air flow monitor, a gas detector, and a resistance temperature detector. Examples of a parameter that is measured by a sensor device 165 can include, but are not limited to, occupancy in the volume of space 199, motion in the volume of space 199, a temperature, a level of gas, a level of humidity, an amount of ambient light in the volume of space 199, and a pressure wave.

In some cases, the parameter or parameters measured by a sensor device 165 can be used to operate one or more of the electrical device components 142 of the electrical device 102-1. In addition, or in the alternative, the one or more parameters measured by a sensor device 165 can be used to locate one or more objects 160 in accordance with certain example embodiments. For example, if a sensor device 165 is configured to detect the presence of an object 160, that information can be used to determine whether a communication (e.g., a RF signal 195) received from a communication device 190 of an object 160 should be forwarded to a network manager 180.

A sensor device 165 can be an integrated sensor. In integrated sensor has both the ability to sense and measure at least one parameter and the ability to communicate with another component (e.g., the communication device 190 of an object 160, a WAC 185). The communication capability of a sensor device 165 that is an integrated sensor can include one or more communication devices that are configured to communicate with, for example, the controller 104 of the electrical device 102-1, a WAC 185, and/or a controller (substantially similar to the controller 104 described herein) of another electrical device 102-N. For example, an integrated sensor device 165 can include a passive infrared (PIR) sensor, a transceiver that sends and receives signals using Zigbee, a receiver that receives signals using BLE, and a receiver that actively receives IR signals. In such a case, the PIR sensor measures IR light radiating from objects in its field of view, often for the purpose of detecting motion.

Each sensor device 165 can use one or more of a number of communication protocols. This allows a sensor device 165 to communicate with one or more components (e.g., a communication device 190 of an object 160, a WAC 185, one or more other integrated sensor devices 165) of the system 100. The communication capability of a sensor device 165 that is an integrated sensor can be dedicated to the sensor device 165 and/or shared with the controller 104 of the electrical device 102-1. When the system 100 includes multiple integrated sensor devices 165, one integrated sensor device 165 can communicate, directly or indirectly, with one or more of the other integrated sensor devices 165 in the system 100.

If the communication capability of a sensor device 165 is an integrated sensor is dedicated to the sensor device 165, then the sensor device 165 can include one or more components (e.g., a transceiver 124, a communication module 108), or portions thereof, that are substantially similar to the corresponding components described above with respect to the controller 104. A sensor device 165 can be associated with the electrical device 102-1 and/or another electrical device 102 in the system 100. A sensor device 165 can be located within the housing 103 of the electrical device 102-1, disposed on the housing 103 of the electrical device 102-1, or located outside the housing 103 of the electrical device 102-1.

In certain example embodiments, a sensor device 165 can include an energy storage device (e.g., a battery) that is used to provide power, at least in part, to some or all of the sensor device 165. In such a case, the energy storage device can be the same as, or independent of, an energy storage device or other power supply 140 of the electrical device 102-1. The optional energy storage device of the sensor module 165 can operate at all times or when the power supply of the electrical device 102-1 is interrupted. Further, a sensor device 165 can utilize or include one or more components (e.g., memory 122, storage repository 130, transceiver 124) found in the controller 104. In such a case, the controller 104 can provide the functionality of these components used by the sensor device 165. Alternatively, the sensor device 165 can include, either on its own or in shared responsibility with the controller 104, one or more of the components of the controller 104. In such a case, the sensor device 165 can correspond to a computer system as described below with regard to FIG. 2.

As discussed above, the electrical device 102 can include one or more optional antennae 175. An antenna 175 is an electrical device that converts electrical power to RF signals 195 (for transmitting) and RF signals 195 to electrical power (for receiving). In transmission, a radio transmitter (e.g., transceiver 124) supplies, through the optional switch 145 when multiple antenna 175 are involved, an electric current oscillating at radio frequency (i.e. a high frequency alternating current (AC)) to the terminals of the antenna 175, and the antenna 175 radiates the energy from the current as RF signals 195. In reception, an antenna 175, when included in the electrical device 102, intercepts some of the power of RF signals 195 in order to produce a tiny voltage at its terminals, that is applied to a receiver (e.g., transceiver 124), in some cases through an optional switch 145, to be amplified.

An antenna 175 can typically consist of an arrangement of electrical conductors that are electrically connected to each other (often through a transmission line) to create a body of the antenna 175. The body of the antenna 175 is electrically coupled to the transceiver 124. An oscillating current of electrons forced through the body of an antenna 175 by the transceiver 124 will create an oscillating magnetic field around the body, while the charge of the electrons also creates an oscillating electric field along the body of the antenna 175. These time-varying fields radiate away from the antenna 175 into space as a moving transverse RF signal 195 (often an electromagnetic field wave). Conversely, during reception, the oscillating electric and magnetic fields of an incoming RF signal 195 exert force on the electrons in the body of the antenna 175, causing portions of the body of the antenna 175 to move back and forth, creating oscillating currents in the antenna 175.

In certain example embodiments, an antenna 175 can be disposed at, within, or on any portion of the electrical device 102. For example, an antenna 175 can be disposed on the housing 103 of the electrical device 102 and extend away from the electrical device 102. As another example, an antenna 175 can be insert molded into a lens of the electrical device 102. As another example, an antenna 175 can be two-shot injection molded into the housing 103 of the electrical device 102. As yet another example, an antenna 175 can be adhesive mounted onto the housing 103 of the electrical device 102. As still another example, an antenna 175 can be pad printed onto a circuit board within the cavity 101 formed by the housing 103 of the electrical device 102. As yet another example, an antenna 175 can be a chip ceramic antenna that is surface mounted. As still another example, an antenna 175 can be a wire antenna.

When there are multiple antennae 175 (or other forms of multiple communication points) as part of the electrical device 102, there can also be an optional switch 145, which allows for selection of one communication point at a given point in time. In such a case, each antenna 175 can be electrically coupled to the switch 145, which in turn is electrically coupled to the transceiver 124. The optional switch 145 can be a single switch device or a number of switch devices arranged in series and/or in parallel with each other. The switch 145 determines which antenna 175 is coupled to the transceiver 124 at any particular point in time. A switch 145 can have one or more contacts, where each contact has an open state (position) and a closed state (position).

In the open state, a contact of the switch 145 creates an open circuit, which prevents the transceiver 124 from delivering a RF signal 195 to or receiving a RF signal 195 from the antenna 175 electrically coupled to that contact of the switch 145. In the closed state, a contact of the switch 145 creates a closed circuit, which allows the transceiver 124 to deliver a RF signal 195 to or receive a RF signal 195 from the antenna 175 electrically coupled to that contact of the switch 145. In certain example embodiments, the position of each contact of the switch 145 is controlled by the control engine 106 of the controller 104.

If the switch 145 is a single device, the switch 145 can have multiple contacts. In any case, only one contact of the switch 145 can be active (closed) at any point in time in certain example embodiments. Consequently, when one contact of the switch 145 is closed, all other contacts of the switch 145 are open in such example embodiments.

Figure 2:
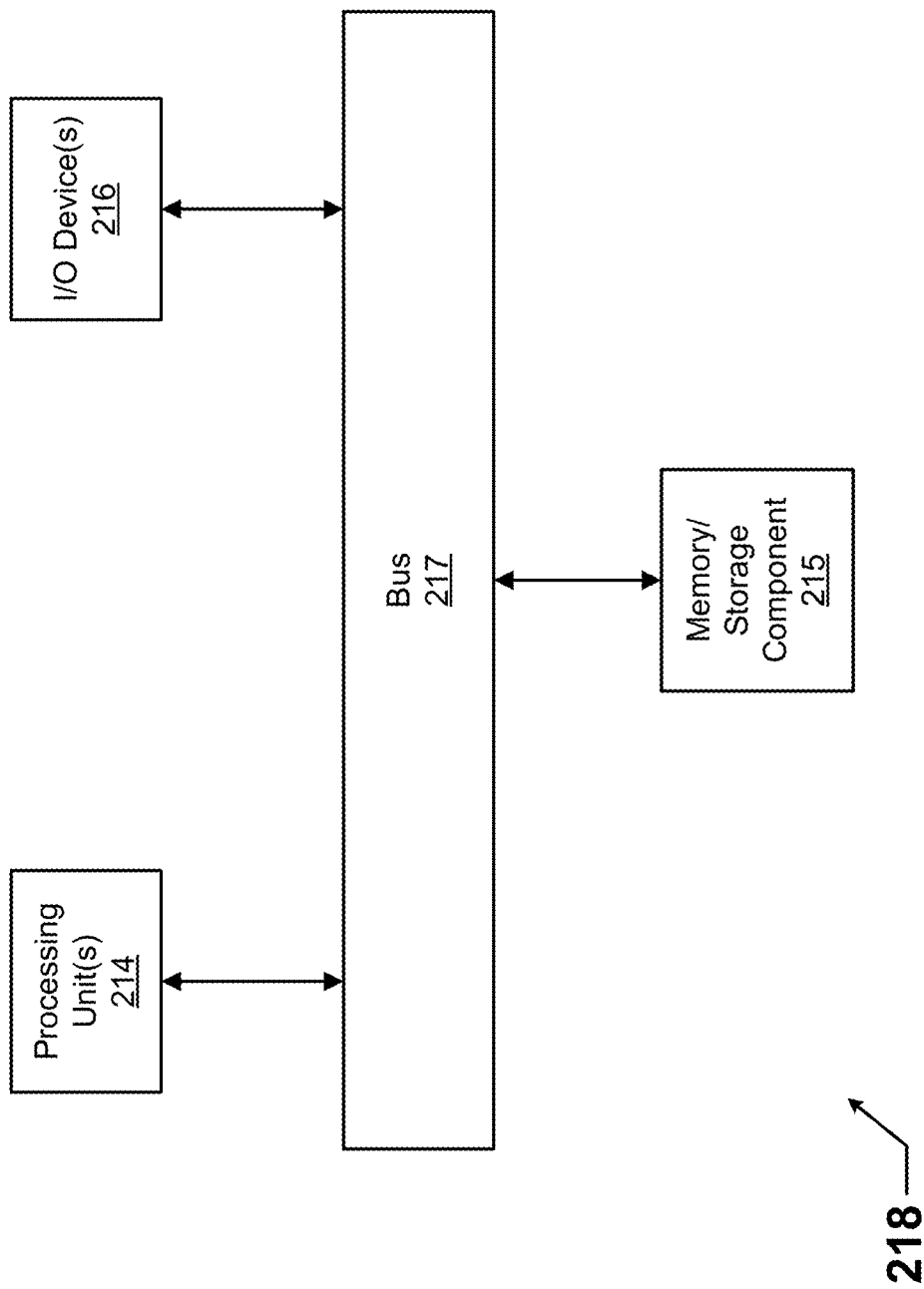
FIG. 2 shows a computing device in accordance with certain example embodiments.

FIG. 2 illustrates one embodiment of a computing device 218 that implements one or more of the various techniques described herein, and which is representative, in whole or in part, of the elements described herein pursuant to certain exemplary embodiments. For example, computing device 218 can be implemented in the electrical device 102-1 of FIG. 1 in the form of the hardware processor 120, the memory 122, and the storage repository 130, among other components. Computing device 218 is one example of a computing device and is not intended to suggest any limitation as to scope of use or functionality of the computing device and/or its possible architectures. Neither should computing device 218 be interpreted as having any dependency or requirement relating to any one or combination of components illustrated in the example computing device 218.

Computing device 218 includes one or more processors or processing units 214, one or more memory/storage components 215, one or more input/output (I/O) devices 216, and a bus 217 that allows the various components and devices to communicate with one another. Bus 217 represents one or more of any of several types of bus structures, including a memory bus or memory controller, a peripheral bus, an accelerated graphics port, and a processor or local bus using any of a variety of bus architectures. Bus 217 includes wired and/or wireless buses.

Memory/storage component 215 represents one or more computer storage media. Memory/storage component 215 includes volatile media (such as random access memory (RAM)) and/or nonvolatile media (such as read only memory (ROM), flash memory, optical disks, magnetic disks, and so forth). Memory/storage component 215 includes fixed media (e.g., RAM, ROM, a fixed hard drive, etc.) as well as removable media (e.g., a Flash memory drive, a removable hard drive, an optical disk, and so forth).

One or more I/O devices 216 allow a customer, utility, or other user to enter commands and information to computing device 218, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 218 is connected to a network (not shown) (e.g., a LAN, a WAN such as the Internet, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 218 includes at least the minimal processing, input, and/or output means necessary to practice one or more embodiments.

Further, those skilled in the art will appreciate that one or more elements of the aforementioned computer device 218 is located at a remote location and connected to the other elements over a network in certain exemplary embodiments. Further, one or more embodiments is implemented on a distributed system having one or more nodes, where each portion of the implementation (e.g., control engine 106) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

Figure 3:
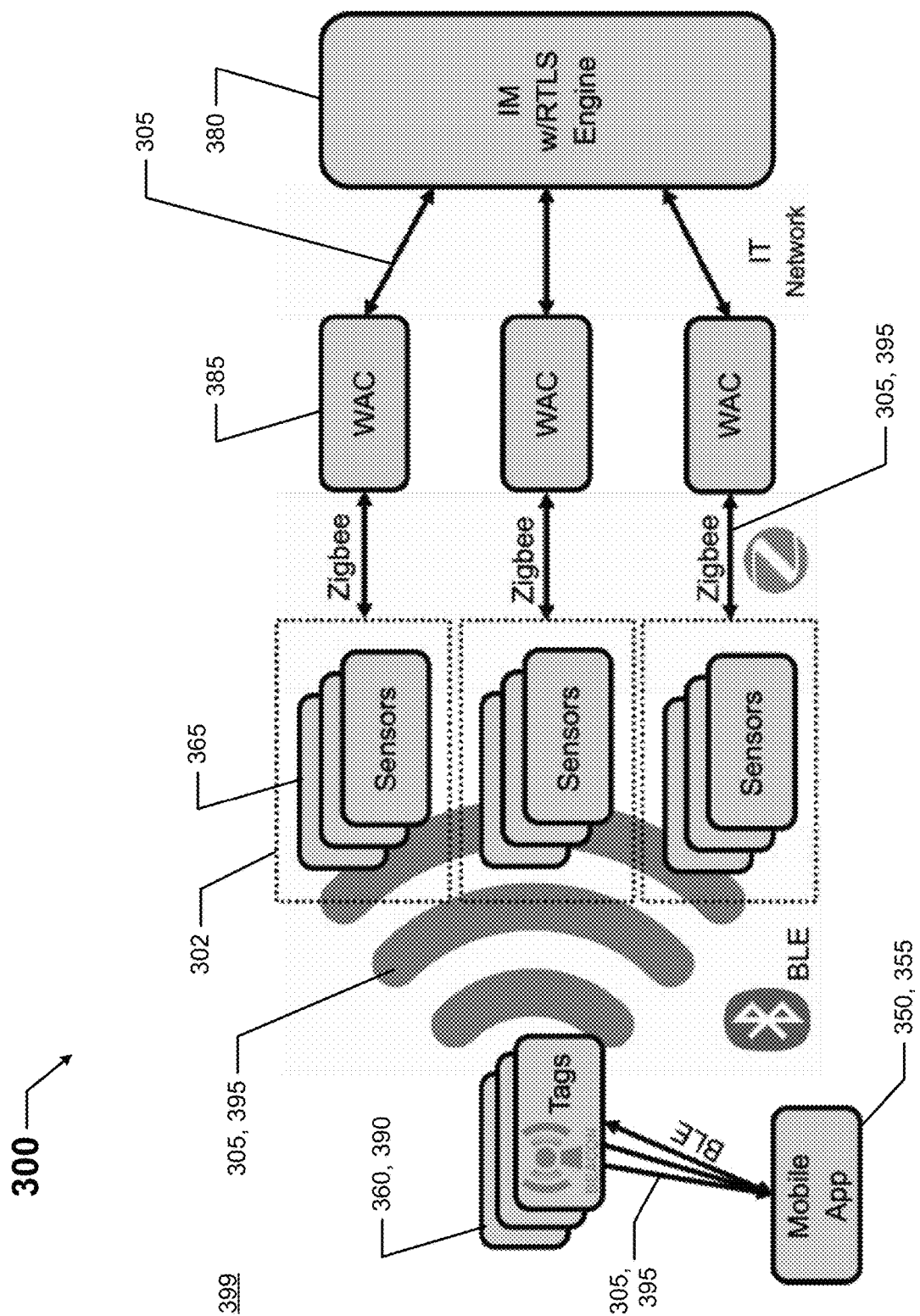
FIG. 3 shows a diagram of another system in accordance with certain example embodiments.

FIG. 3 shows a diagram of another RTLS system 300 in accordance with certain example embodiments. Referring to FIGS. 1 through 3, the RTLS system 300 includes a user 350 with a user system 355, multiple objects 360 each having a communication device 390 (in this case called a tag), a number of electrical devices 302 each having one or more sensor devices 365, a number of controllers 385 (in this case called wireless access controllers (WACs)), and a network manager 380 (in this case called an insight manager (IM) with a RTLS engine). Each of these components of the system 300 of FIG. 3 can be substantially the same as the corresponding component of the RTLS system 100 of FIG. 1. For example, each sensor device 365 can include a Zigbee-enabled transceiver, a BLE-enabled receiver, a PIR sensor, and an active IR receiver.

In this particular case, the communication devices 390 of the objects 360 are the physical entities that are tracked by the RTLS system 300. From the perspective of a user 350, each communication device 390 is associated with an object 360 (also sometimes called an asset). In this example, the communication devices 390 use BLE (a form of communication link 305 to "beacon" RF signals 395 at a certain rate. A beacon is a broadcast message that, at a minimum, identifies the object 360 associated with the sending communication device 390. The integrated sensor device 365 receives these RF signals 395 over the BLE-enabled communication links 305 and measures the RSSI along with other data included in the RF signal 395.

This RSSI information is the key piece of data in a RF signal 390 that allows a controller 385 and/or network manager 380 to locate, in real time, the communication device 390 (and corresponding object 360) within a volume of space 399 (e.g., in X-Y coordinates, in X-Y-Z coordinates). As used herein, "real time" refers to a user's perspective of the system and means that objects can be located within the time in which the signals are transmitted and processed, such as a few milliseconds to within a few seconds, which time is virtually real time from the user's perspective. Integrated sensor devices 365 communicate with one or more controllers 385 (in this example, WACs 385) using Zigbee-enabled communication links 305. In this case, an integrated sensor device 365 is a Zigbee-enabled device as well as a BLE-enabled device, and so a sensor device 365 can be paired with a single WAC 385.

Communications between a sensor device 365 and a WAC 385 can be limited by one or more of a number of factors. For example, the bandwidth by existing Zigbee (or other communication method) protocols for the communication link(s) 305 between the sensor device 365 and the WAC 385 can limit communications capability. As another example, the capability (e.g., messages per second) of the WAC 385 can limit communications capability. As yet another example, the overall communication activity on the Zigbee-enabled communication links 305, involving all sensor device 365 and WACs 385 at a given point in time, can limit communications capability. With all of these potential constraints, intelligent use of the Zigbee-enabled communication links 305 is fundamental to the success of the RTLS system 300 in locating an object 360 accurately in real time.

The WACs 385, upon receiving the signals from the sensor devices 365 on the Zigbee-enabled communication links 305, send the information in these signals to the network manager 380, which process all of this information (e.g., using one or more algorithms 133) to locate each object 360 within the volume of space 399 in real time. The network manager 380 can store this information and use it for trending analysis, predictive analysis, and/or any other analysis that may be useful.

BLE proximity methods are widely used in the industry to estimate the distance between a BLE transmitter (in this case, a communication device 390 of an object 360) and a BLE receiver (in this case, a sensor device 365O. In a dense and uniformly distributed infrastructure of electrical devices 302 (e.g., a lighting system), these methods can be optimized to achieve greater accuracy by comparing the RSSI at many BLE receivers and performing various calculations (by a WAC 385 or network manager 380) to estimate the location of an object 360.

Reasonable accuracy can be expected with these methods, but two significant challenges are encountered using BLE communication systems. First, the large number of electrical devices 302 (sensor devices 365 or nodes) creates large amounts of data, and the communication network of the system 300 has limited bandwidth. Not all data that is transmitted is useful in establishing the location of an object 360, and care must be taken to provide the best data possible to a WAC 385 or network manager 380 while still maintaining a healthy (e.g., not data constrained) network. In other words, the principal purpose (e.g., lighting) of the system 300 for which the electrical devices 302 is designed should not be affected by the efforts of the system 300 to also locate one or more objects 360 in real time.

Second, no matter how accurate the location estimations of objects 360 are, there can be challenges in achieving reliable room-level or even floor-level accuracy of locating an object 360 using RF signals 395 in the volume of space 399 because RF signals 395 (e.g., transmitted at 2.4 GHz in a BLE-enabled communication network) can penetrate barriers such as walls and floors. As a result, these barriers can cause the location of an object 360 to be falsely identified. Other location methods using example embodiments are needed to accurately locate objects 360 in real time in volumes of space that have such barriers and/or present other challenges to existing location methods.

Figure 4:
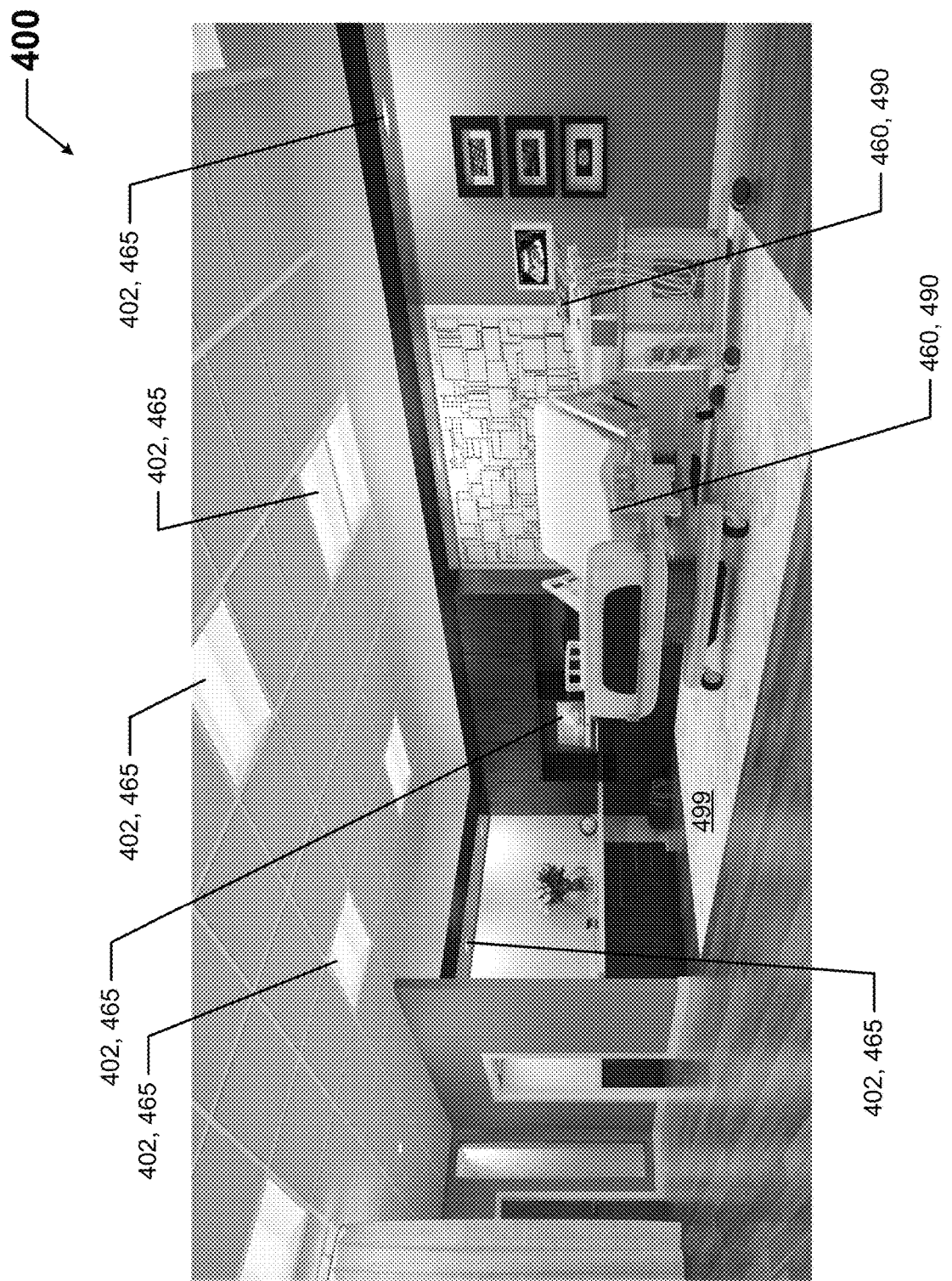
FIG. 4 shows a lighting system in a healthcare environment in accordance with certain example embodiments.

FIG. 4 shows a lighting system 400 that can be used for real-time location of an object 460 in accordance with certain example embodiments. Referring to FIGS. 1 through 4, the lighting system 400 includes a number of electrical devices 402, principally in the form of light fixtures, located in a volume of space 499 that includes a hospital room. A lighting system provides unique advantages for implementing an example RTLS because the density of the electrical devices (light fixtures) supports a dense network of sensors for locating and tracking objects. Of the electrical devices 402 that are light fixtures, there are seven troffer light fixtures and five down can light fixtures disposed in the ceiling. There is also an electrical device 402 in the form of a computer monitor. In this case, each electrical device 402 includes a sensor device 465, substantially similar to the sensor devices 165 discussed above. There are also two objects 460 shown in FIG. 4. One object 460 is a test cart, and the other object 460 is a bed. Each object 460 in this case includes a communication device 490 that is capable of communicating with the sensor devices 465.

Figure 5:
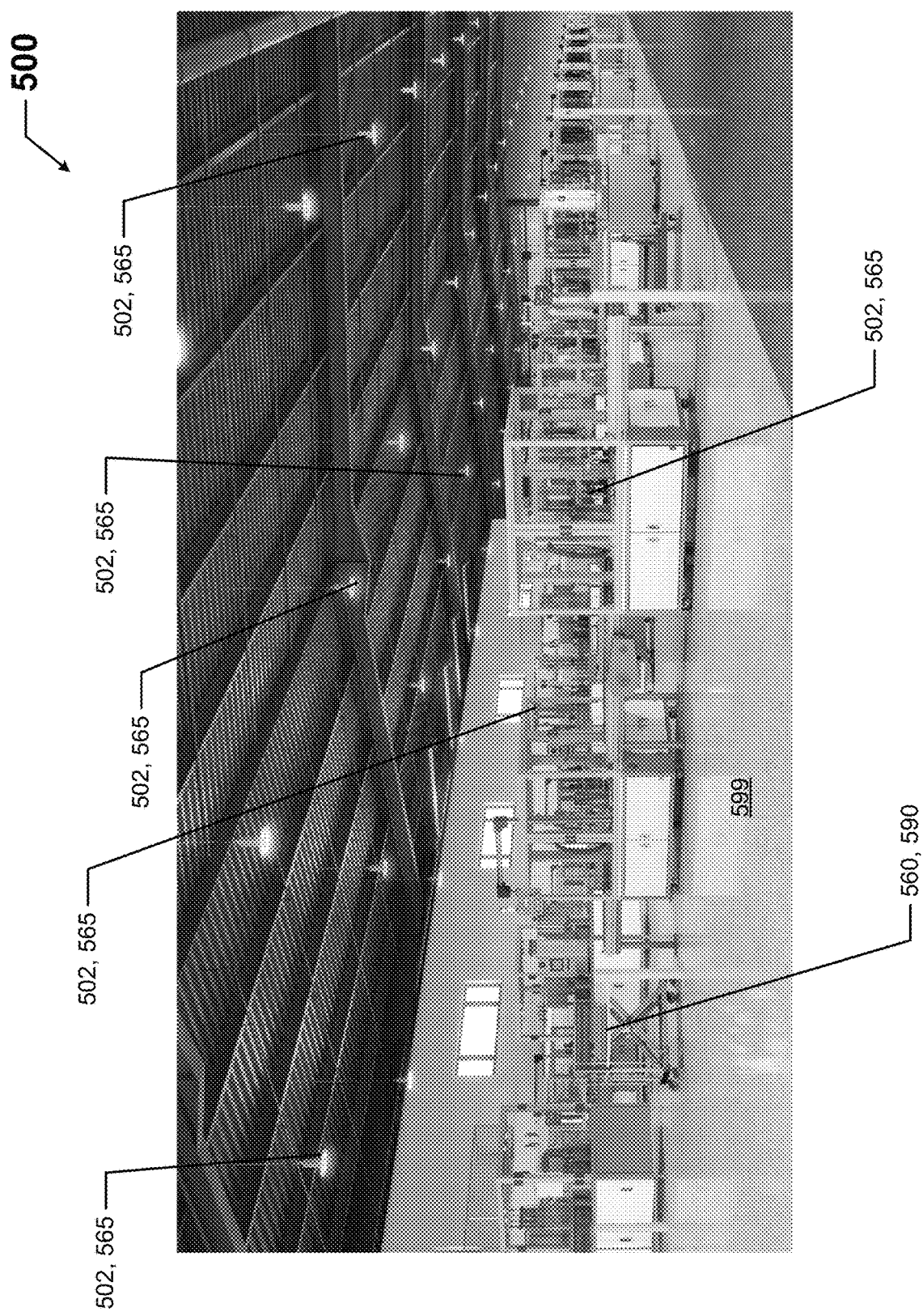
FIG. 5 shows a lighting system in a manufacturing environment in accordance with certain example embodiments.

FIG. 5 shows a lighting system 500 that can be used for real-time location of an object 560 in accordance with certain example embodiments. Referring to FIGS. 1 through 5, the lighting system 500 includes a number of electrical devices 502, principally in the form of light fixtures, located in a volume of space 599 that includes a manufacturing facility. Of the electrical devices 502 that are light fixtures, there are at least 56 Hi-Bay light fixtures suspended from the ceiling and at least 30 work stations located on the floor. In this case, each electrical device 502 includes a sensor device 565, substantially similar to the sensor devices 165 discussed above. There is also an object 560 shown in FIG. 5 that is in the form of a cart. The object 560 in this case includes a communication device 590 that is capable of communicating with the sensor devices 565.

FIGS. 6A and 6B show a side and top view, respectively, of a system 600 in which an object 660 (including its corresponding communication device 690) is located in volume of space 699 in accordance with certain example embodiments. Referring to FIGS. 1 through 6B, also located in the volume of space 699 of FIGS. 6A and 6B are three light fixtures 602 (specifically, light fixture 602-1, light fixture 602-2, and light fixture 602-3), where the light fixtures 602 are types of electrical devices 102 of FIG. 1 above. As discussed above, the volume of space 699 can be of any size and/or in any location. For example, the volume of space 699 can be one or more rooms in an office building.

As shown in FIGS. 6A and 6B, all of the light fixtures 602 can be located in the volume of space 699. Alternatively, one or more of the light fixtures 602 can be located outside the volume of space 699, as long as the RF signals (e.g., RF signals 195) sent by the transceiver (e.g., transceiver 124) of the light fixture 602 are received by the communication device 690 of the object 660, and as long as the RF signals sent by the communication device 690 of the object 660 are received by the transceiver of the corresponding light fixture 602, as applicable.

Each of the light fixtures 602 can include one or more sensor devices 665. In this example, light fixture 602-1 includes sensor device 665-1, light fixture 602-2 includes sensor device 665-2, and light fixture 602-3 includes sensor device 665-3. Such sensor devices 665 can include one or more components. For example, each of the sensor devices 665 of the light fixtures 602 of FIGS. 6A and 6B can include a Zigbee-enabled transceiver, a BLE-enabled receiver, a PIR sensor, and an active IR receiver. In such a case, the BLE-enabled receiver of the sensor device 665, whether on its own or in conjunction with the controller (e.g., controller 104) of the light fixture 602, can determine the signal strength of the RF signals (e.g., RF signals 195) received from the communication device 690 of the object 660.

If the sensor devices 665 of the light fixtures 602 are used to communicate with the communication device 690 of the object 660, then it is the sensor devices 665 that have the broadcasts ranges 782. In such a case, sensor device 665-1 of light fixture 602-1 has broadcast range 782-1 inside of which the sensor device 665-1 broadcasts signals (e.g., RF signals). Similarly, sensor device 665-2 of light fixture 602-2 has broadcast range 782-2 inside of which the sensor device 665-2 broadcasts signals, and sensor device 665-3 of light fixture 602-3 has broadcast range 782-3 inside of which the sensor device 665-3 broadcasts signals.

FIG. 7 shows the system 700 of FIGS. 6A and 6B when a RF signal 795 is sent by one of the light fixtures 602 in accordance with certain example embodiments. Referring to FIGS. 1 through 7, light fixture 602-1 broadcasts a RF signal 795. Each light fixture 602 has a broadcast range 782. In this case, light fixture 602-1 has broadcast range 782-1, light fixture 602-2 has broadcast range 782-2, and light fixture 602-3 has broadcast range 782-3. Since the communication device 690 of the object 660 is located within the broadcast range 782-1 for light fixture 602-1, the communication device 690 of the object 660 receives RF signal 795.

In the event that the sensor devices 665 are used to communicate with the communication device 690 of the object 660, sensor device 665-1 can have broadcast range 782-1. In such a case, sensor device 665-1 can send (e.g., broadcast) RF signal 795 into the volume of space 699, and the communication device 690 of the object 660 receives the RF signal 795 because the communication device 690 of the object 660 is within the broadcast range 782-1. The RF signal 795 can be sent, as an example, using BLE.

FIG. 8 shows the system 800 of FIGS. 6A through 7 when a RF signal 895 is sent by the communication device 690 of the object 660 in accordance with certain example embodiments. Referring to FIGS. 1 through 8, the RF signal 895 sent by the communication device 690 of the object 660 can be in response to the RF signal 795 sent by light fixture 602-1, as shown in FIG. 7. Alternatively, the communication device 690 of the object 660 can send the RF signal 895 independent of any other component (e.g., a light fixture 602) or factor. As discussed above, the RF signal 895 broadcast by the communication device 690 of the object 660 can include the UUID of the object 660 (or portion thereof) as well as other code, such as, for example, identifying information of the light fixture 602-1 that sent the RF signal 795.

The communication device 690 of the object 660 has a broadcast range 882, and all three of the light fixtures 602 are located within the broadcast range 882 of the communication device 690 of the object 660. As a result, as shown in FIG. 8, all three of the light fixtures 602 receive the RF signal 895 broadcast by the communication device 690 of the object 660. When each light fixture 602 receives the RF signal 895 broadcast by the communication device 690 of the object 660, that light fixture 602 measures the signal strength (e.g., the RSSI value) of the RF signal 895.

For example, since the communication device 690 of the object 660 appears to be equidistant between light fixture 602-1 and light fixture 602-2, the signal strength of the RF signal 895 measured by light fixture 602-1 and light fixture 602-2 should be substantially the same. Also, since light fixture 602-3 is further away from the communication device 690 of the object 660 compared to light fixture 602-1 and light fixture 602-2, the signal strength of the RF signal 895 measured by light fixture 602-3 should be less than what is measured by light fixture 602-1 and light fixture 602-2.

As discussed above, in the event that the sensor devices 665 are used to communicate with the communication device 690 of the object 660, sensor device 665-1, sensor device 665-2, and sensor device 665-3 can each receive the RF signal 895 broadcast by the communication device 690 of the object 660 because sensor device 665-1, sensor device 665-2, and sensor device 665-3 area all within the broadcast range 882 of the communication device 690 of the object 660. The RF signal 895 can be sent, as an example, using BLE.

Figure 9A:
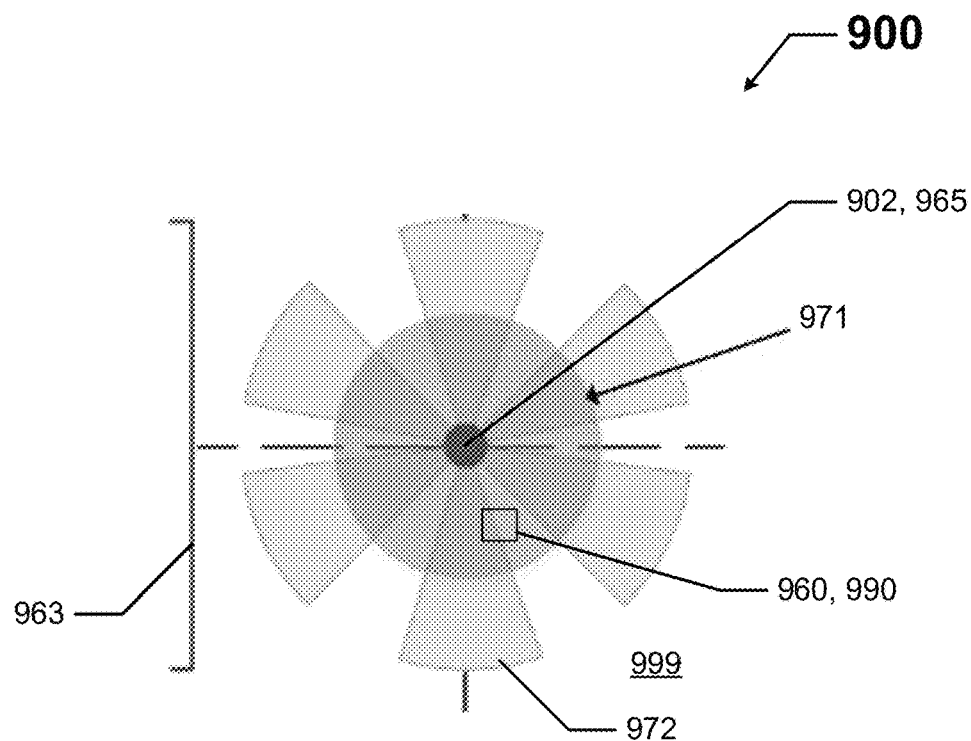
FIGS. 9A and 9B show a top view and a side view, respectively, of a system used for locating an object in a volume of space in accordance with certain example embodiments.
Figure 9B:
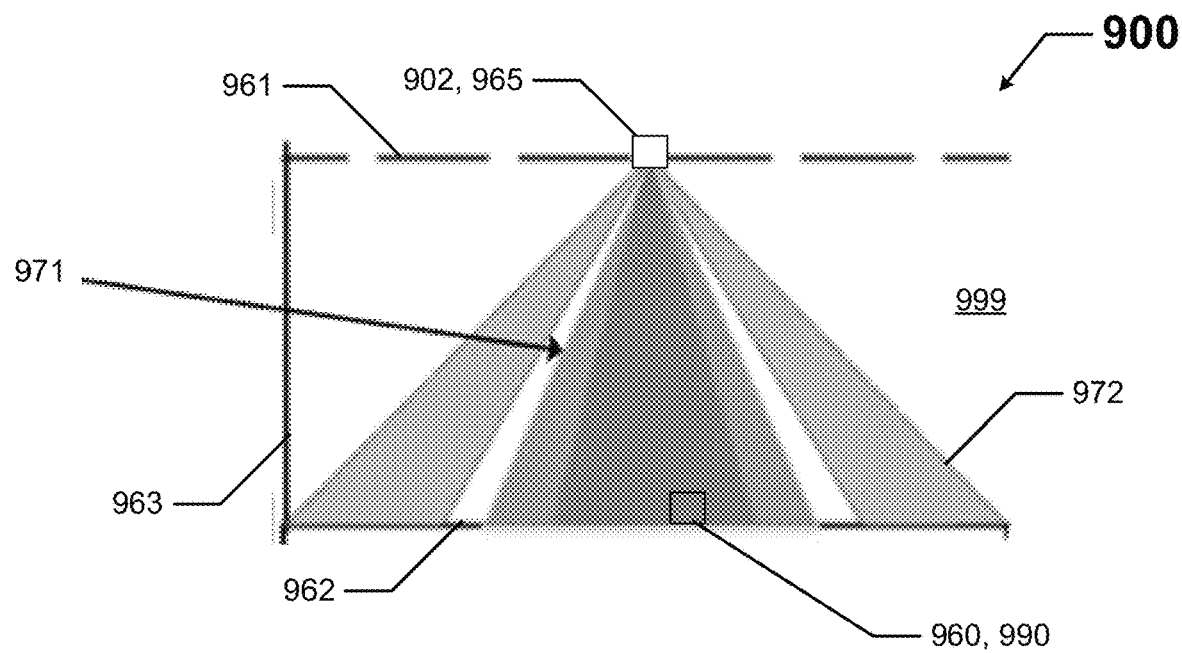

As discussed above, example embodiments can be used with any of a number of methods to accurately and efficiently locate an object in a volume of space in real time. Some of these examples are discussed below with respect to FIGS. 9A through 11. FIGS. 9A and 9B show a top view and a side view, respectively, of part of a system 900 used for locating an object in a volume of space 999 in accordance with certain example embodiments.

Referring to FIGS. 1 through 9B, the part of the system 900 of FIGS. 9A and 9B has a single electrical device 902 (e.g., a light fixture mounted on a ceiling 961) and a single object 960 in a volume of space 999. The electrical device 902 is part of a larger integrated network of electrical devices, such as what is shown and described above with respect to FIGS. 1 and 3A through 8. In this case, the electrical device 902 includes an integrated sensor device 965 that has (or shares with the controller of the electrical device 902) a Zigbee-enabled transceiver, a BLE-enabled receiver, and an active IR receiver. The sensor device 965 can also include a PIR sensor. In alternative embodiments, the sensor device 965 can be a stand-alone device.

The method used to locate the object 960 in this case reduces communications traffic on the communication links (e.g., communication links 105) between the integrated sensor device 965 and a WAC (not shown in FIG. 9A or 9B, but substantially similar to the WAC 185 discussed above). The PIR sensor of the integrated sensor device 965 (or any other sensor included with the sensor device 965) can have any of a number of configurations. For example, in this case, the PIR sensor of the sensor device 965 has a sensing range 972, which is somewhat similar to the broadcast ranges 682 discussed above in that the sensing range 972 defines the scope within the volume of space 999 in which the PIR sensor can measure passive infrared signals.

A method for tracking that is computationally light and also lower-impact to the ZigBee network (or other type of communication network) between the sensor device 965 and a WAC (e.g., WAC 185) is to push as much of the location computation as far down (toward the sensor device 965) the system 900 as possible. For example, as in this case, the integrated sensor device 965 can determine whether or not the object 960 is within a certain proximity to the sensor device 965. In such a case, the sensor device 965 needs only to send a status message to the WAC indicating the object 960 is in fact very close to that sensor device 965. This proximity area is called the RTLS occupancy zone 971.

The RTLS occupancy zone 971 is located within the sensing range 972 of the PIR sensor of the sensor device 965. Unlike the sensing range 972 of the PIR sensor, the RTLS occupancy zone 971 is designed to be smaller and only minimally overlap with a corresponding RTLS occupancy zone of a PIR sensor of a neighboring sensor (not shown in FIGS. 9A and 9B). The RTLS occupancy zone 971 is updated at a fast rate and generally detects very recent motion within a constrained physical area very close in proximity to the PIR sensor of the sensor device 965.

Acceptability of the lower resolution of zonal tracking, used in this case, compared to regression over many energy data points, used in the current art, arises because objects 960 that moves are usually already identified (or there is little need to find the object 960 as much as determine high-level transitions between sensing ranges 972 of PIR sensors of sensor devices 965 as the object 960 moves). When an object 960 is stationary, lower time-resolution and higher spatial-resolution is needed to find that object 960. To accomplish this lower resolution of zonal tracking, one or more algorithms (e.g., algorithms 133) and/or one or more protocols (e.g., protocols 132) can be used to determine whether a sensor device 965 should send a signal to a WAC (e.g., WAC 185) regarding the identification and/or location of the object 960.

An example of such an algorithm and protocol combination can be that if the sensor device 965 receives a RF signal (e.g., using a BLE-enabled communication link 105) that has a RSSI greater than a threshold value (e.g., 2 dBm, as stored in the storage repository 130) within some period of time (e.g., within the past 3 seconds, as measured by the timer 110), and if the PIR sensor of the sensor device 965 detects occupancy within the RTLS occupancy zone 971, then the sensor device 965 sends a message to a WAC, where the message includes the ID of the object 960 and the RSSI of the signal sent by the communication device 990 of the object 960 and received by the sensor device 965. In such a case, the message can be sent from the sensor device 965 to the WAC using a communication link 105 (e.g., Zigbee-enabled).

Effectively, a sensor device 965 that has not detected the object 960 (e.g., occupancy) for some period of time is removed from the RTLS network or is made to report less frequently. Some level of "heartbeat" must be maintained for stationary objects 960. The method outlined above can be useful for objects 960 that move within the volume of space 999. The result is a zonal system which relies on the sensor devices 965 to report whether or not an object 960 is within a certain zone in the volume of space 999, rather than a system that has all of the sensor devices 965 constantly report, which requires large amounts of data to be processed farther up the network (e.g., by a WAC, by the network manager).

In some cases, occupancy information can be used at the application layer (e.g., by the sensor devices 965) to disallow reporting moving objects 960 in volumes of space 999 (or portions thereof) that are not occupied. In alternative embodiments, occupancy data, as generated by the sensor devices 965, can be collected by the WACs, which can subsequently send the occupancy data continually to the network manager. In such a case, since such messages can be time-stamped, the occupancy indicator bit of those messages would convey whether occupancy has been detected within some period of time (e.g., within the last 5 seconds).

When a volume of space (e.g., volume of space 199) is divided into multiple rooms and/or floors, it can be difficult to locate an object (e.g., object 160) within one of those rooms and/or floors when using BLE-enabled communication because BLE signals penetrate walls, floors, and ceilings. On the other hand, IR signals do not penetrate walls, floors, and ceilings. Many existing RTLS systems therefore use IR signals to maintain basic consistent room-level zonal accuracy. However, there are times when BLE-enabled communication is preferred or more advantageous. For sensor devices (e.g., sensor device 165) that includes a BLE receive, a PIR sensor, and an active IR receiver, those sensor devices can receive encoded messages from an object. An object that has combined BLE and IR communication capability can beacon using both IR and BLE, with BLE conveying the bulk of the intended information (e.g., location) and IR providing only the ID of the object.

Figure 10:
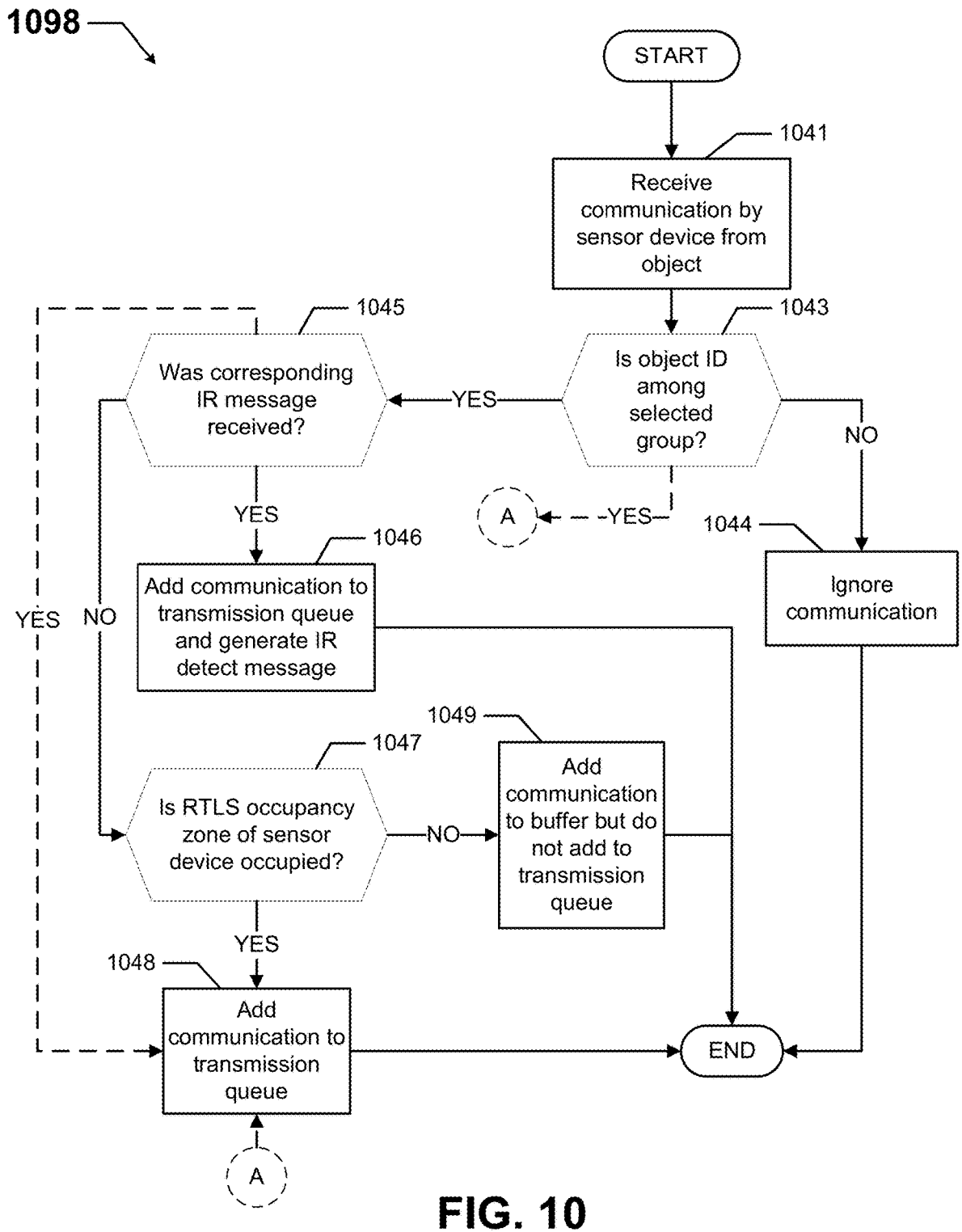
FIG. 10 shows a flowchart of a method for locating an object in real time in accordance with certain example embodiments.

FIG. 10 shows a flowchart 1098 of an example method for locating an object (e.g., sensor device 160) in real time using an example system (e.g., system 100) that includes an integrated sensor device (e.g., sensor device 165). While the various steps in this flowchart are presented sequentially, one of ordinary skill will appreciate that some or all of the steps may be executed in different orders, may be combined or omitted, and some or all of the steps may be executed in parallel. Further, in one or more of the example embodiments, one or more of the steps shown in this example method may be omitted, repeated, and/or performed in a different order.

In addition, a person of ordinary skill in the art will appreciate that additional steps not shown in FIG. 10 may be included in performing this method. Accordingly, the specific arrangement of steps should not be construed as limiting the scope. Further, a particular computing device, such as the computing device discussed above with respect to FIG. 2, can be used to perform one or more of the steps for the methods shown in FIG. 10 in certain example embodiments. The method discussed in FIG. 10 is not exclusive, meaning that the real-time location of objects (e.g., object 160) using various other types of integrated sensors is possible using example embodiments.

The method shown in FIG. 10 is merely an example that can be performed by using an example system described herein. In other words, systems for locating objects in a volume of space in real time can perform other functions and/or locate objects in real time using other methods in addition to and/or aside from those shown in FIG. 10. Referring to FIGS. 1 through 10, the method shown in the flowchart 1098 of FIG. 10 begins at the START step and proceeds to step 1041, where a communication is received by a sensor device (e.g., sensor device 165) from a communication device (e.g., communication device 190) of an object (e.g., object 160). In certain example embodiments, the sensor device is an integrated sensor, which can include a BLE receiver, an active IR receiver, a Zigbee transceiver, and/or any other receiver, transmitter, and/or transceiver that is enabled for any of a number of other communication protocols.

The sensor module 165 can receive the communication from the communication device 190 of the object 160 using one or more of these receivers. For example, a BLE receiver of the sensor module 165 can be used to receive a RF signal 195 (a form of communication) from the communication device 190 of the object 160. The sensor module 165 can be configured (either directly or in coordination with a controller 104 of an electrical device 102) to determine the RSSI of the RF signal 195 (or other form of communication) received from the communication device 190 of the object 160. The RF signal 195 (or other form of communication) sent by the communication device 190 of the object 160 can include an ID of the object 160.

In step 1043, a determination is made as to whether the ID associated with the object 160 that sent the communication in step 1041 is from among a selected group. For example, a determination can be made as to whether the ID of the object 160 is associated with the MAC address of a particular manufacturer. This determination can be made by the integrated sensor module 165, the controller 104 of an associated electrical device 102, or some other component of the system 100. The selected group can be established, altered, defined, deleted, or otherwise manipulated by a user 150 (including a user system 155), the network manager 180, and/or some other component of the system 100.

If the ID associated with the object 160 that sent the communication in step 1041 is not from among the selected group, then the process proceeds to step 1044. If the ID associated with the object 160 that sent the communication in step 1041 is from among the selected group, then the process proceeds to step 1045. In some optional alternative embodiments, if there is no IR capability (or communication protocol aside from what is used in step 1041) with the communication device 190 of the object 160 and/or the integrated sensor module 165, then the process can proceed to step 1049 if the ID associated with the object 160 that sent the communication in step 1041 is from among the selected group. In other alternative embodiments, if the integrated sensor module 165 has the capability to generate a RTLS occupancy zone 971, then the process can proceed to step 1047 if the ID associated with the object 160 that sent the communication in step 1041 is from among the selected group.

In step 1044, the communication received from the communication device 190 of the object 160 in step 1041 is ignored. The communication can be ignored by the sensor device 165. Alternatively, the sensor device 165 can send a subsequent communication that includes the information contained in the communication to the controller 104 and/or a WAC 185, which ignores that subsequent communication. When step 1044 is complete, the process proceeds to the END step.

In step 1045, a determination is made as to whether a corresponding IR message is received by the integrated sensor device 165 from the communication device 190 of the object 160. In certain example embodiments, rather than an IR message, a corresponding message can be based on some other communication protocol and/or technology that differs from that used for the communication of step 1041. The determination can be made by a controller 104 of an associated electrical device 102 or a portion of the sensor device 165 that includes such direct capability.

If a corresponding IR message is not received by the integrated sensor device 165 from the communication device 190 of the object 160, then the process proceeds to step 1047. If a corresponding IR message is received by the integrated sensor device 165 from the communication device 190 of the object 160, then the process proceeds to step 1046. In certain optional alternative embodiments, if a corresponding IR message is received by the integrated sensor device 165 from the communication device 190 of the object 160, then the process can proceed to step 1048.

In step 1046, the communication is added to a transmission queue and an IR detect message is generated. The transmission queue is a list of communications received from one or more objects 160 and that is subsequently (e.g., immediately, at a time determined by the integrated sensor device 165) sent by the integrated sensor device 165 to a WAC 185 or some other component in the system 100. The communication added to the transmission queue can refer to the communication in step 1041. The IR detect message (or message using some other communication protocol and/or technology) of step 1045 can be generated by the integrated sensor device 165, the controller 104 of an associated electrical device 102, or any other suitable component of the system 100. In some cases, the IR detect message can also be added to the transmission queue once generated. When step 1046 is completed, the process proceeds to the END step.

In step 1047, a determination is made as to whether the RTLS occupancy zone 971 of the integrated sensor device 165 is occupied. The RTLS occupancy zone 971 can be established by, and occupancy within the RTLS occupancy zone 971 can be determined by, a PIR sensor (or other type of sensor) of the integrated sensor device 165. The integrated sensor device 165 can determine that the object 165 is what occupies the RTLS occupancy zone 971. If the RTLS occupancy zone 971 of the integrated sensor device 165 is occupied, then the process proceeds to step 1048. If the RTLS occupancy zone 971 of the integrated sensor device 165 is not occupied, then the process proceeds to step 1049.

In step 1048, the communication is added to a queue for transmitting. The communication can be a reformatted or repackaged version of the original communication received by the integrated sensor device 165 from the communication device 190 of the object 160. The queue can be for subsequent communications sent (e.g., using Zigbee-enabled communication links 105) by the integrated sensor device 165 to a WAC 185 or other component of the system 100. When step 1048 is completed, the process proceeds to the END step.

In step 1049, the communication is added to a buffer but is not added to a queue for transmitting. The communication can be a reformatted or repackaged version of the original communication received by the integrated sensor device 165 from the communication device 190 of the object 160. The buffer can be a kind of short-term memory component of the integrated sensor device 165 that holds the communication for a limited period of time or until the buffer becomes full, at which time the oldest communication in the buffer is removed to make room for the most recent communication to be added to the buffer. When step 1049 is completed, the process proceeds to the END step.

In a densely-populated system 100 of electrical devices 102 (which can include integrated sensors) with few obstructions, such as an open office, a communication (e.g., RF signal 895) broadcast by a single communication device 190 of a single object 160 is received by all integrated sensor devices 165 within the broadcast (e.g., broadcast range 882) of the communication device 190 of the object 160. As a result, many transmissions of essentially the same data will be sent by the sensor devices 165 to one or more WACs 185 using the communication links 105 (e.g., Zigbee-enabled), which are bandwidth constrained.

Since there is diminished value of additional RSSI data points associated to the RF signal broadcast by the communication device 190 of the object 160, the overall traffic on the communication links 105 between the integrated sensor devices 165 and the WACs 185 can be reduced by only allowing communications that include in its contents RSSI values that exceed a threshold value. After reception of a communication of a communication device 190 of an object 160 by an integrated sensor device 165, the integrated sensor device 165 delays translating and sending a subsequent communication to a WAC 185 by a progressively increased back-off period that is based on (e.g., inversely related to) the RSSI value of the communication received from the communication device 190 of the object 160.

If the back-off time elapses before a minimum number of other communications identifying the object 160 are received by the WAC 185, then the sensor device 165 having received a communication with a lower RSSI value from the communication device 190 of the object 160 transmits its subsequent communication to a WAC 185. However, if a WAC 185 and/or network manager 180 receives reports from at least the minimum number of sensor modules 165, then the sensor module 165 having received a communication from the communication device 190 of an object 160 having a relatively low RSSI value does not send its subsequent communication to the WAC 185. An example of such a method of locating an object 160 in real time is shown below with respect to FIG. 11.

Figure 11:
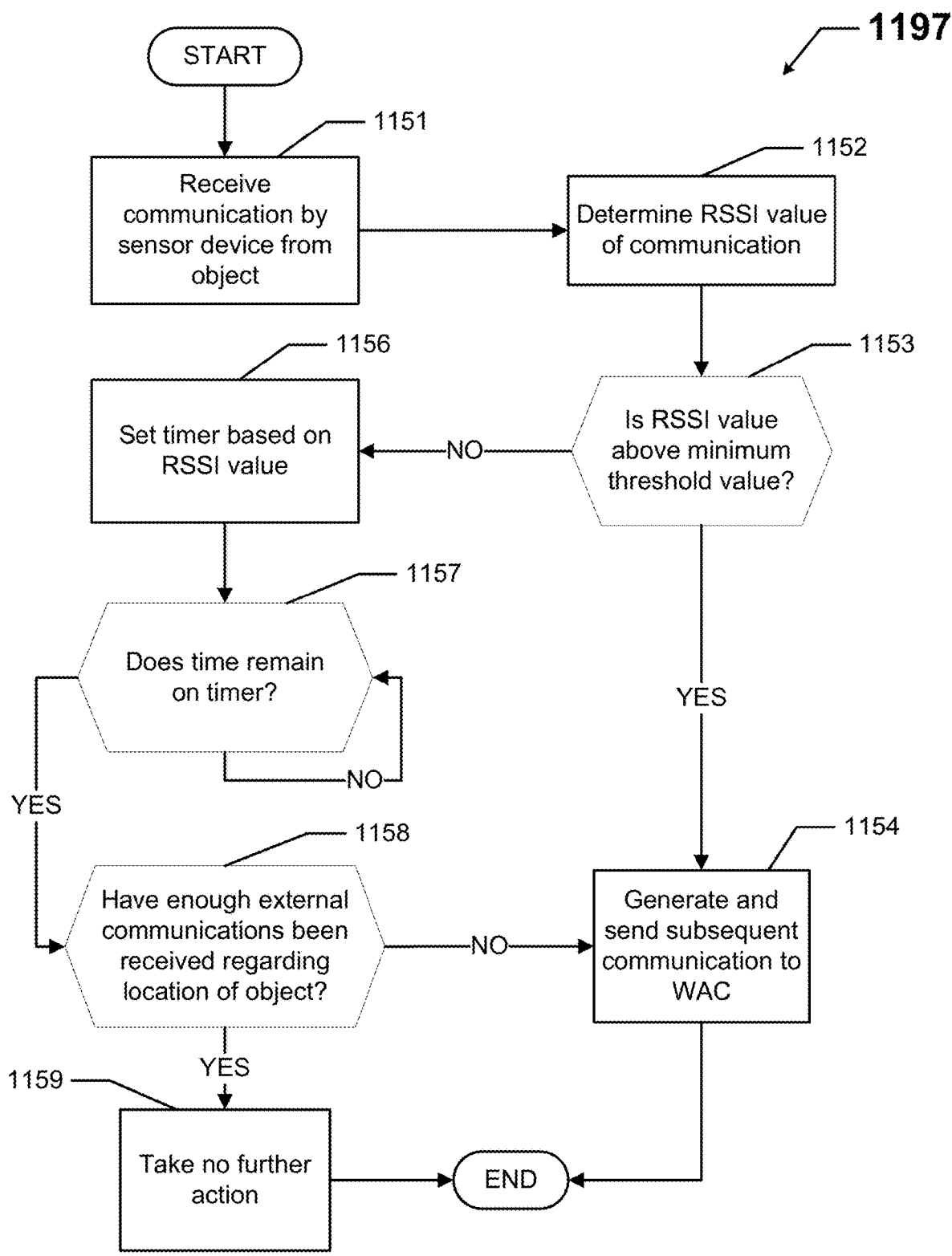
FIG. 11 shows a flowchart of another method for locating an object in real time in accordance with certain example embodiments.

FIG. 11 shows a flowchart 1197 of another example method for locating an object (e.g., sensor device 160) in real time using an example system (e.g., system 100) that includes an integrated sensor device (e.g., sensor device 165). While the various steps in this flowchart are presented sequentially, one of ordinary skill will appreciate that some or all of the steps may be executed in different orders, may be combined or omitted, and some or all of the steps may be executed in parallel. Further, in one or more of the example embodiments, one or more of the steps shown in this example method may be omitted, repeated, and/or performed in a different order.

In addition, a person of ordinary skill in the art will appreciate that additional steps not shown in FIG. 11 may be included in performing this method. Accordingly, the specific arrangement of steps should not be construed as limiting the scope. Further, a particular computing device, such as the computing device discussed above with respect to FIG. 2, can be used to perform one or more of the steps for the methods shown in FIG. 11 in certain example embodiments. The method discussed in FIG. 11 is not exclusive, meaning that the real-time location of objects (e.g., object 160) using various other types of integrated sensors is possible using example embodiments.

The method shown in FIG. 11 is merely an example that can be performed by using an example system described herein. In other words, systems for locating objects in a volume of space in real time can perform other functions and/or locate objects in real time using other methods in addition to and/or aside from those shown in FIG. 11. Referring to FIGS. 1 through 11, the method shown in the flowchart 1197 of FIG. 11 begins at the START step and proceeds to step 1151, where a communication is received by a sensor device 165 from a communication device 190 of an object 160. The sensor device 165 can be one or a number of sensor devices 165 that receive the communication. In certain example embodiments, the sensor device 165 is an integrated sensor device. The communication can be received using any communication protocol (e.g., BLE) available to the sensor device 165.

In step 1152, the sensor device 165 determines the RSSI of the communication. In alternative embodiments, if the sensor device 165 does not have the capability of directly determining the RSSI of the communication, then another component (e.g., the controller 104) of the system can determine the RSSI of the communication.

In step 1153, a determination is made as to whether the RSSI value of the communication falls above a minimum threshold value. The minimum threshold value can be part of the data stored in the storage repository 130 of the electrical device 102-1 or a storage repository within the integrated sensor device 165. The determination can be made by a portion (e.g., a controller) of the integrated sensor device 165, the controller 104 of the electrical device 102-1, or some other component of the system 100. The minimum threshold value can be set by a user 150, by default, based on historical operating data, and/or some other factor. The minimum threshold value can be fixed or adjustable. If the RSSI value of the communication falls above a minimum threshold value, then the process proceeds to step 1154. If the RSSI value of the communication does not fall above a minimum threshold value, then the process proceeds to step 1156.

In step 1154, a subsequent communication is generated and sent to a WAC 185. The subsequent communication can be generated and sent by the integrated sensor device 165. The subsequent communication can include, for example, the ID of the object 160, the RSSI value of the communication received from the object 160, and the ID of the integrated sensor device 165. The subsequent communication generated and sent to a WAC 185 can be performed in substantially real time. When step 1154 is complete, the process proceeds to the END step.

In step 1156, a timer is set based on the RSSI value of the initial communication of step 1151. The timer can be part of the integrated sensor device 165 or the timer 110 of the controller 104 of the electrical device 102-1. The amount that the timer is set for can be based on data stored in the storage repository 130 of the electrical device 102-1 or a storage repository within the integrated sensor device 165. The amount of time that the timer is set can be inversely proportional to the RSSI value. For example, if the RSSI value is relatively high, the amount of time that the timer is set can be relatively small. Conversely, if the RSSI value is relatively low, the amount of time that the timer is set can be relatively large. In alternative embodiments, the length of the timer setting is standard, regardless of the RSSI value of the initial communication of step 1151.

In step 1157, a determination is made as to whether time remains on the timer. If time remains on the timer, then the process reverts to step 1157 in a closed loop. If timer no longer remains on the timer, then the process proceeds to step 1158. In step 1158, a determination is made as to whether enough external communications have been received regarding the location of the object 160. The determination can be made by (and communicated to the sensor device 165 by) the network manager 180, a WAC 185, or a controller 104 of an electrical device 102. If enough external communications have not been received regarding the location of the object 160, then the process reverts to step 1154. If enough external communications have been received regarding the location of the object 160, then the process proceeds to step 1159.

In step 1159, no further action is taken. This can mean that the integrated sensor device 165 stores the information from the communication of step 1151 in a buffer without sending the information in a subsequent communication. Alternatively, the integrated sensor device 165 can erase or delete the information from the communication of step 1151. Once step 1159 has been completed, the process proceeds to the END step.

Figure 12:
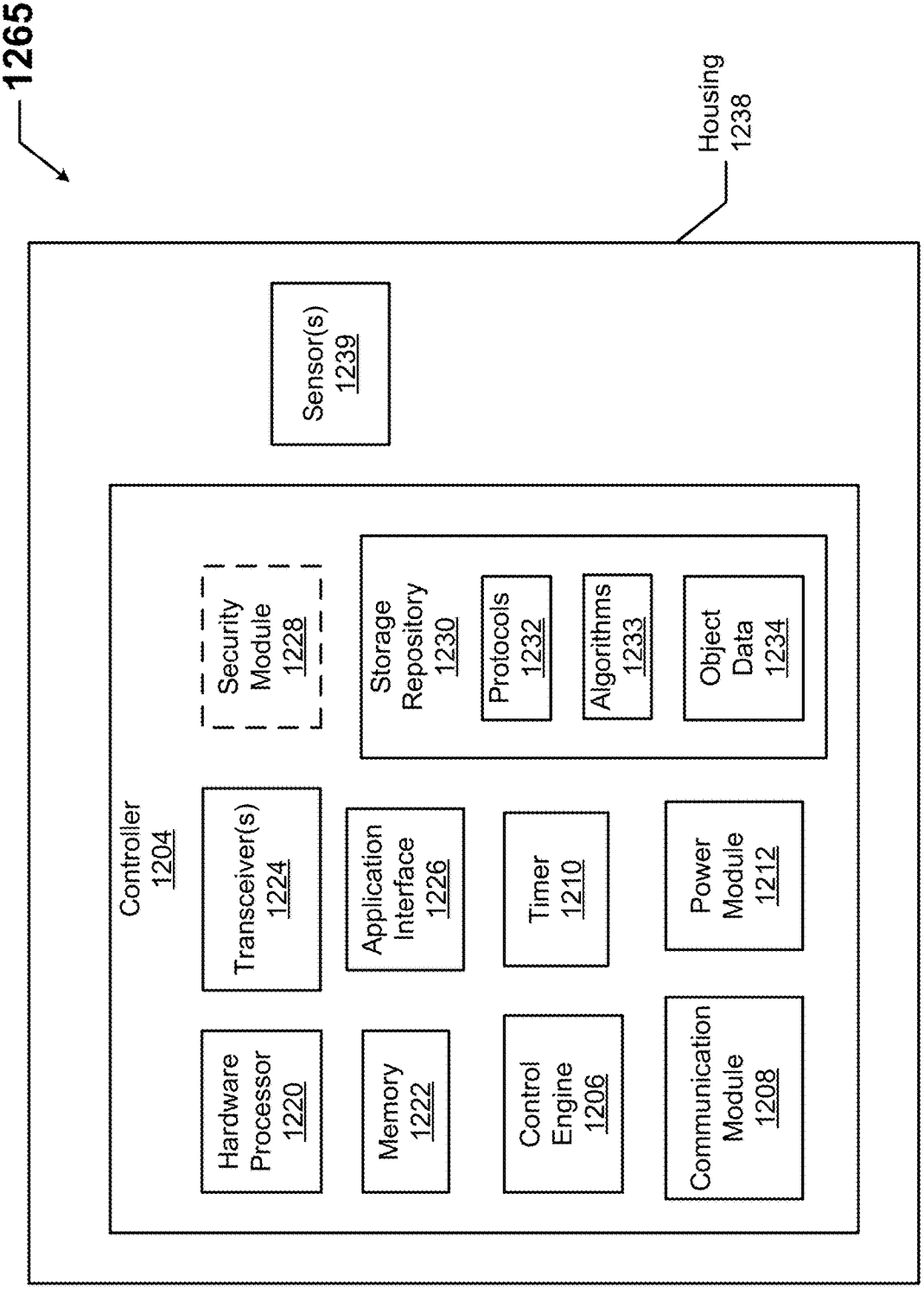
FIG. 12 shows a diagram of an integrated sensor module in accordance with certain example embodiments.

FIG. 12 shows a diagram of an integrated sensor module 1265 in accordance with certain example embodiments. Referring to FIGS. 1 through 12, the integrated sensor module 1265 of FIG. 12 can include one or more of a number of components. Such components, can include, but are not limited to, a controller 1204 (which can include, for example, a control engine 1206, a communication module 1208, a timer 1210, a power module 1212, a storage repository 1230, a hardware processor 1220, a memory 1222, one or more transceivers 1224, an application interface 1226, and, optionally, a security module 1228) and one or more sensors 1239. The components shown in FIG. 12 are not exhaustive, and in some embodiments, one or more of the components shown in FIG. 12 may not be included in an example integrated sensor device 1265. Any component of the example integrated sensor device 1265 can be discrete, combined with one or more other components of the integrated sensor device 1265, and/or shared with the controller 104 of the electrical device 102-1 associated with the integrated sensor device 1265.

The controller 1204, the control engine 1206, the communication module 1208, the timer 1210, the power module 1212, the storage repository 1230 (which can include protocols 1231, algorithms 1232, and object data 1234), the hardware processor 1220, the memory 1222, the one or more transceivers 1224, the application interface 1226, and the security module 1228 can be substantially the same as the corresponding components of the controller 104 discussed above with respect to FIG. 1. In the case of the power module 1212 of the integrated sensor device 1265, the power module 1212 can be substantially the same as, at least in part, the power module 112 and/or the power supply 140 of the electrical device 102-1. Each of the one or more sensors 1239 of the integrated sensor device 1265 are the components that actually measure one or more parameters. An example of a sensor 1239 is a PIR sensor. Each component of the integrated sensor device 1265 can be disposed within, on, or external from a housing 1238 of the integrated sensor device 1265.

In one or more example embodiments, an integrated sensor device is used to more efficiently locate an object in a volume of space relative to current systems and methods. The integrated sensor device combines both sensing ability (measuring one or more parameters) and at least one communication protocol and/or method (e.g., IR, Zigbee, BLE) that can be followed. In certain cases, the integrated sensor device can communicate in multiple protocols and/or methods. Example embodiments can be used in new systems or retrofit into existing systems. Example embodiments include new or updated software so that a network of integrated sensor devices can work more efficiently together to provide location information, based on RSSI values of communications received from an object, to a network manager or similar component of the system. Example embodiments can provide real-time location of an object in volume of space. Using example embodiments described herein can improve communication, safety, maintenance, costs, and operating efficiency.

Accordingly, many modifications and other embodiments set forth herein will come to mind to one skilled in the art to which example embodiments pertain having the benefit of the teachings presented in the foregoing descriptions and the associated drawings. Therefore, it is to be understood that example embodiments are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A system for locating an object in a volume of space, comprising:
    a communication device of the object disposed in the volume of space, wherein the communication device broadcasts a first communication signal into the volume of space, wherein the first communication signal comprises a first identification of the object;
    a plurality of integrated sensor devices disposed in the volume of space, wherein each integrated sensor device of the plurality of integrated sensor devices comprises at least one sensor, at least one receiver, and at least one transmitter, wherein the at least one receiver of a first subset of the plurality of integrated sensor devices receives the first communication signal broadcast by the communication device of the object, wherein each integrated sensor device that receives the first communication signal determines a signal strength of the first communication signal;
    at least one access controller communicably coupled to the plurality of integrated sensor devices, wherein the at least one access controller receives at least one second communication signal sent by the at least one transmitter of each integrated sensor device of the first subset of the plurality of integrated sensor devices, wherein the at least one second communication signal comprises the first identification of the object and a second identification of each integrated sensor device of the first subset of the plurality of integrated sensor devices, wherein the at least one second communication signal is associated with the signal strength of the first communication signal received by each integrated sensor device of the first subset of the plurality of integrated sensor devices; and
    a network manager communicably coupled to the access controller, wherein the network manager receives at least one third communication signal from the at least one access controller, wherein the at least one third communication signal comprises the first identification of the object and the second identification of each integrated sensor device of the first subset of the plurality of integrated sensor devices, wherein the network manager determines a location of the object in the volume of space based on the at least one third communication signal.

2. The system of claim 1, wherein at least one sensor device of the plurality of integrated sensor devices is integrated with an electrical device.

3. The system of claim 2, wherein the electrical device comprises a light fixture.

4. The system of claim 1, wherein the first communication signal is a radio frequency signal.

5. The system of claim 1, wherein the at least one second signal is generated by the first subset of the plurality of integrated sensor devices and sent to the at least one access controller after a determination that the first identification of the object is among a list of selected identifications, and wherein the first communication signal is ignored by the plurality of integrated sensor devices if the first identification of the object is not among the list of selected identifications.

6. The system of claim 1, wherein the access controller can map a location of each of the first subset of the plurality of integrated sensor devices within the volume of space.

7. The system of claim 1, wherein the at least one receiver further receives an infrared signal sent by the communication device of the object.

8. The system of claim 1, wherein the first communication is transmitted using Bluetooth Low Energy, and wherein the at least one second communication is transmitted using Zigbee.

9. The system of claim 1, wherein the plurality of integrated sensor devices comprises a timer that creates a time stamp associated with the first communication signal, wherein the at least one second communication signal includes the time stamp.

10. A system for locating an object in a volume of space, comprising:
    a communication device of the object disposed in the volume of space, wherein the communication device broadcasts a first communication signal into the volume of space, wherein the first communication signal comprises a first identification of the object;
    a plurality of integrated sensor devices disposed in the volume of space, wherein each integrated sensor device of the plurality of integrated sensor devices comprises at least one sensor, at least one receiver, and at least one transmitter, wherein the at least one receiver of a first subset of the plurality of integrated sensor devices receives the first communication signal broadcast by the communication device of the object, wherein each integrated sensor device that receives the first communication signal determines a signal strength of the first communication signal;
    at least one access controller communicably coupled to the plurality of integrated sensor devices, wherein the at least one access controller receives at least one second communication signal sent by the at least one transmitter of each integrated sensor device of the first subset of the plurality of integrated sensor devices,
    wherein the at least one second communication signal comprises the first identification of the object and a second identification of each integrated sensor device of the first subset of the plurality of integrated sensor devices, wherein the at least one second communication signal is associated with the signal strength of the first communication signal received by each integrated sensor device of the first subset of the plurality of integrated sensor devices; and
    wherein the at least one second signal is sent from an integrated sensor device of the first subset of the plurality of integrated sensor devices to the at least one access controller after a delay measured by a timer, wherein the delay is based on the signal strength of the first communication signal received by the integrated sensor device from the communication device of the object.

11. The system of claim 10, wherein the at least one second signal is further sent from an integrated sensor device of the first subset of the plurality of integrated sensor devices to the at least one access controller after a determination that a minimum number of the first subset of the plurality of integrated sensor devices have yet to send the at least one second signal.

12. A system for locating an object in a volume of space, comprising:
- a communication device of the object disposed in the volume of space, wherein the communication device broadcasts a first communication signal into the volume of space, wherein the first communication signal comprises a first identification of the object;
- a plurality of integrated sensor devices disposed in the volume of space, wherein each integrated sensor device of the plurality of integrated sensor devices comprises at least one sensor, at least one receiver, and at least one transmitter, wherein the at least one receiver of a first subset of the plurality of integrated sensor devices receives the first communication signal broadcast by the communication device of the object, wherein each integrated sensor device that receives the first communication signal determines a signal strength of the first communication signal; and
- at least one access controller communicably coupled to the plurality of integrated sensor devices, wherein the at least one access controller receives at least one second communication signal sent by the at least one transmitter of each integrated sensor device of the first subset of the plurality of integrated sensor devices, wherein the at least one second communication signal comprises the first identification of the object and a second identification of each integrated sensor device of the first subset of the plurality of integrated sensor devices, wherein the at least one second communication signal is associated with the signal strength of the first communication signal received by each integrated sensor device of the first subset of the plurality of integrated sensor devices, wherein the at least one sensor of the plurality of integrated sensor devices measures occupancy when the object is within a sensing range, wherein the at least one second communication signal further comprises a first message that the object is within the sensing range, wherein the at least one sensor device further measures an occupancy zone within the sensing range, wherein the at least one second communication signal further comprises a second message that the object is within the occupancy zone, and wherein the at least one second communication signal is held in a buffer by the first subset of the plurality of integrated sensor devices when the sensor device determines that the object is outside the occupancy zone.

13. The system of claim 12, wherein the at least one sensor device comprises a passive infrared sensor.

* * * * *